(12) United States Patent
DiBacco

(10) Patent No.: US 6,988,084 B1
(45) Date of Patent: Jan. 17, 2006

(54) AUTOMATED SYSTEM FOR ANALYZING CHARGES AND CREDITS OF BANKS AND OTHER FINANCIAL INSTITUTIONS

(75) Inventor: Francis E. DiBacco, Turnersville, NJ (US)

(73) Assignee: F.E. DiBacco, Inc., Woodbury, NJ (US)

(*) Notice: Subject to any disclaimer, the term of this patent is extended or adjusted under 35 U.S.C. 154(b) by 992 days.

(21) Appl. No.: 09/614,762

(22) Filed: Jul. 11, 2000

(51) Int. Cl.
G06F 17/60 (2006.01)

(52) U.S. Cl. .......................... 705/38; 705/35
(58) Field of Classification Search ................. 705/42, 705/45, 35–40
See application file for complete search history.

(56) References Cited

U.S. PATENT DOCUMENTS

| | | | | |
|---|---|---|---|---|
| 6,038,553 | A * | 3/2000 | Hyde | 705/45 |
| 6,202,054 | B1 * | 3/2001 | Lawlor | 705/42 |
| 6,230,145 | B1 * | 5/2001 | Verderamo | 705/35 |
| 6,282,523 | B1 * | 8/2001 | Tedesco | 705/45 |

FOREIGN PATENT DOCUMENTS

EP 0841624 A1 * 5/1998

OTHER PUBLICATIONS

ChargeBack.com.*
Strategis.gc.ca (1996).*
Covaleski, John M "XBRL Spurs Great Expectations" Bank Technology News, V15 n2 p7(3) Feb. 2002.*

* cited by examiner

Primary Examiner—Jagdish N. Patel
Assistant Examiner—Narayanswamy Subramanian
(74) Attorney, Agent, or Firm—Akin Gump Strauss Hauer & Feld, LLP

(57) ABSTRACT

A computer-implemented process prepares bank service charge reports for banking activity of a client. An electronic translator is provided for converting service charge items of a plurality of individual banks, expressed in terminology of the respective individual banks, to a service description expressed in a standardized terminology. Bank service charge items and bank account data are inputted into a computer. The bank service charge items and bank account data are for a specified period of time for one or more banks being used by a client. The bank service charge items and bank account data are obtained from one or more bank statements of a client and are expressed in the one or more statements in terminology used by the one or more banks. In the computer, one or more bank service charge reports are automatically created for the client from the inputted bank service charge items by using the electronic translator. Each bank service charge report provides a breakdown of bank service charges based upon the standardized service descriptions. A historical database is provided of average bank service charges for selected standardized service descriptions based upon bank service charges of a plurality of clients. The individually broken down bank service charges are compared to the average bank service charges to identify potentially excessive bank service charges. A similar process is performed for earnings credit items.

22 Claims, 29 Drawing Sheets

FIG. 1 (part 1)

| REPORT | CURRENT CLIENT AWARENESS | ILLUMINATED CLIENT AWARENESS |
|---|---|---|
| Bank Balance Data | Service charges paid with comp balances considered | Actual bottom-line service charges paid |
| Earnings Credit Analysis | Incorrect assumptions as to earnings attained through assets | Actual Yield %, Additional Income Realized from Getting T-Bill Rate, Banks Which Are Shaving Points off of T-Bill |
| | Most clients have no awareness to money made by Fed Funds investing | Shows money bank is making by investing it at Fed Funds Rate |
| | No simple method of becoming aware of how well their banks are doing, would require research of bank's annual report. Not aware of how much the difference is between bank earnings and what earnings credit posted is. | Shows how much money bank is making over and above the earnings credit posted |
| Earnings Credit Analysis (Negative Collected) | Incorrect assumptions or no knowledge of what the ratio is between EC and Neg. Collected | Shows exactly what this ratio is. Ultimate fairness would be 1:1 |
| Checks, Deposits and Float Data | Has no simple way to know bank float tables can differ from actual days check was floated | Ensures when money is available to bank it becomes earning asset for client |
| | No simple method of verifying proper check distribution pertaining to In District/Out Of District | Verifies that In District/Out of District ratios are realistic. |
| | No simple method of verifying Checks On Us | Ensures that cash which should be immediately available is actually avail. |
| Breakdown By Service Charge Groups | No method of determining how the service charges are allocated | Sees breakdown by Deposit Costs, Check Costs and Account Maintenance |
| By User Selected Groups | Cannot analyze any portion of the service charges, especially between banks | Sees complete analysis of any service category desired |

| Unit Price Summary | No method of consolidating or even knowing what each line item service charge is costing | Shows every line item, every bank and every store – includes monthly totals, yearly projections. |
|---|---|---|
| Analysis By Unit Price | No way of knowing which banks are more competitive than others | Makes negotiating with bank possible |
| Deposit Ticket Costs | No way of knowing the precise cost of making bank deposits | Tracks each bank and all costs related to deposit tickets |
| | Automatically makes deposits daily or twice daily. Follows old adage, get the money in the bank as quickly as possible. | Shows potential bottom-line loss if certain break even points are not met. |
| Cash Activity Costs | Total cost is now easily attainable, still does not determine best method. | Shows the best method of handling the counting of cash per $1000 |
| | Client assumes bank's reporting is correct | Provides a check and balance for client that proper amount of cash is being counted |
| Banking Activity | | Report facilitates illumination. |

FIG. 1 (part 2)

SUPER-CON STORES
10/31/1999

Bank Balance Data

| Bank | Bank | City | State | Average Ledger Balance | Float | Average Collected Balance | Avg Negative Collected | Avg Positive Collected Balance | Reserve | Average Investable Balance | EC | Earnings | Negative Collected | Negative Collected | Service Charges |
|---|---|---|---|---|---|---|---|---|---|---|---|---|---|---|---|
| 1 | 013 | EASTERN SAVINGS CO. | CLEVELAND | OH | 12,184 | 386 | 11,798 | 0 | 11,798 | 1,180 | 10,618 | 4.38 | 38.76 | 0.00 | 0.00 | 569.68 |
| 2 | 024 | WESTERN SAVINGS CO. | CLEVELAND | OH | 553,489 | 78,882 | 474,607 | 30,658 | 505,265 | 50,527 | 454,739 | 3.77 | 1,428.64 | 11.00 | 281.03 | 15035.17 |
| 3 | 050 | THE BANK OF NASHVILLE | NASHVILLE | TN | 37,178 | 1,522 | 35,656 | 0 | 35,656 | 3,566 | 32,090 | 4.00 | 106.97 | 0.00 | 0.00 | 663.16 |
| 4 | 106 | UNITED NATIONS BANK | ATLANTA | GA | 8,043 | 30 | 8,013 | 0 | 8,013 | 801 | 7,212 | 3.69 | 22.18 | 0.00 | 0.00 | 212.60 |
| 5 | 182 | BANK WITH U.S. | CINCINNATI | OH | 377,046 | 11,909 | 365,137 | 0 | 365,137 | 36,514 | 328,623 | 3.90 | 1,068.03 | 0.00 | 0.00 | 7347.35 |
| 6 | 211 | COMMERCIAL BANK | DETROIT | MI | 7,653 | 187 | 7,467 | 0 | 7,467 | 747 | 6,720 | 4.60 | 25.76 | 0.00 | 0.00 | 450.11 |
| 7 | 242 | THE BANK OF | CLEVELAND | OH | -1,282,706 | 20,491 | -1,303,19 | 2,134,97 | 831,780 | 83,178 | 748,602 | 4.26 | 2,656.41 | 4.36 | 7,763.31 | 17169.48 |
| 8 | 251 | MIDWESTERN BANK ONE | YOUNGSTOWN | OH | 23,899 | 59 | 23,840 | 0 | 23,840 | 2,384 | 21,456 | 3.00 | 53.64 | 0.00 | 0.00 | 255.89 |
| 9 | 484 | APPLE BANK | ERIE | PA | 6,962 | 51 | 6,911 | 0 | 6,911 | 691 | 6,220 | 3.78 | 19.59 | 0.00 | 0.00 | 125.77 |
| 10 | 493 | NCP BANK | LOUISVILLE | KY | 185,210 | 11,425 | 173,785 | 0 | 173,785 | 17,379 | 156,407 | 4.28 | 557.85 | 0.00 | 0.00 | 4626.32 |
| 11 | 567 | SOUTHERN UNION BANK | MEMPHIS | TN | 8,536 | 342 | 8,194 | 0 | 8,194 | 819 | 7,374 | 4.80 | 29.50 | 0.00 | 0.00 | 71.43 |
| 12 | 741 | NORTHERN TRUST BANK | KNOXVILLE | TN | 9,966 | 554 | 9,412 | 0 | 9,412 | 941 | 8,471 | 3.36 | 23.72 | 0.00 | 0.00 | 326.36 |
| 13 | 849 | NORTHERN TRUST BANK | CAMPBELLSVILLE | KY | 4,326 | 70 | 4,256 | 0 | 4,256 | 426 | 3,830 | 0.00 | 0.00 | 0.00 | 0.00 | 49.50 |
| 14 | 850 | BANK OF ENGLAND | LONDON | KY | 5,037 | 0 | 5,037 | 0 | 5,037 | 504 | 4,533 | 5.12 | 19.32 | 0.00 | 0.00 | 26.78 |
| 15 | 851 | NATIONAL BANK | LOUISVILLE | KY | 4,294 | 460 | 3,834 | 0 | 3,834 | 460 | 3,374 | 2.30 | 6.47 | 0.00 | 0.00 | 16.11 |
| 16 | 852 | SOUTHERN BANK | LEXINGTON | KY | 2,754 | 19 | 2,735 | 0 | 2,735 | 274 | 2,462 | 4.10 | 8.41 | 0.00 | 0.00 | 19.44 |
| 17 | 853 | MIDWESTERN TRUST CO | MIDDLESBORO | KY | 10,476 | 1,135 | 9,341 | 0 | 9,341 | 934 | 8,407 | 4.25 | 29.78 | 0.00 | 0.00 | 107.78 |
| 18 | 854 | NEBRASKA TRUST | HODGENVILLE | KY | 16,923 | 1,441 | 15,482 | 0 | 15,482 | 1,548 | 13,934 | 4.19 | 48.65 | 0.00 | 0.00 | 184.13 |
| 19 | 855 | TRISTAR BANK | CLEVELAND | OH | 49,493 | 1,228 | 48,265 | 0 | 48,265 | 4,827 | 43,439 | 3.68 | 133.21 | 0.00 | 0.00 | 1218.14 |
| 20 | 856 | SKY TRUST | AKRON | OH | 11,304 | 14 | 11,290 | 0 | 11,290 | 1,129 | 10,161 | 1.99 | 16.85 | 0.00 | 0.00 | 42.74 |
| 21 | 857 | KEY TRUST | EAST LIVERPOOL | OH | 12,242 | 47 | 12,195 | 0 | 12,195 | 1,220 | 10,976 | 4.89 | 44.73 | 0.00 | 0.00 | 118.20 |
| 22 | 858 | KEY UNION BANK | CLEVELAND | OH | 35,890 | 0 | 35,890 | 6,930 | 42,820 | 4,282 | 38,538 | 0.59 | 18.95 | 0.00 | 0.00 | 8556.36 |
| | | Totals: | | | 100,199 | 130,251 | -30,052 | 2,172,565 | 2,142,513 | 214,328 | 1,928,185 | | 6,357.40 | | 8,044.34 | $57,192.50 |

Fig. 2

SUPER-CON STORES
10/31/1999

Earnings Credit Analysis

3e →

| Bank | Bank Name | City | State | Average Investable | EC | Basis Points | Earnings Credit | Annual Projected Income ||| Income Difference |||
|---|---|---|---|---|---|---|---|---|---|---|---|---|---|
| | | | | | | | | Treasury Bill | Federal Funds | Interest Yield | Treasury Bill | Federal Funds | Interest Yield |
| 1 | 849 NORTHERN TRUST BANK KY | CAMPBELLSVILLE | KY | 3,830 | 0.00 | 503.00 | 0.00 | 192.65 | 210.65 | 306.40 | 192.65 | 210.65 | 306.40 |
| 2 | 858 KEY UNION BANK | CLEVELAND | OH | 38,538 | 0.59 | 444.00 | 227.37 | 1,938.47 | 2,119.60 | 3,083.05 | 1,711.09 | 1,892.22 | 2,855.67 |
| 3 | 856 SKY TRUST | AKRON | OH | 10,161 | 1.99 | 304.00 | 202.21 | 511.11 | 558.86 | 812.89 | 308.90 | 356.66 | 610.69 |
| 4 | 851 NATIONAL BANK | LOUISVILLE | KY | 3,374 | 2.30 | 273.00 | 77.60 | 169.70 | 185.56 | 269.90 | 92.10 | 107.96 | 192.30 |
| 5 | 251 MIDWESTERN BANK ONE | YOUNGSTOWN | OH | 21,456 | 3.00 | 203.00 | 643.68 | 1,079.23 | 1,180.08 | 1,716.47 | 435.56 | 536.40 | 1,072.80 |
| 6 | 741 NORTHERN TRUST BANK | KNOXVILLE | TN | 8,471 | 3.36 | 167.00 | 284.62 | 426.08 | 465.89 | 677.66 | 141.46 | 181.28 | 393.05 |
| 7 | 855 TRISTAR BANK | CLEVELAND | OH | 43,439 | 3.68 | 135.00 | 1,598.54 | 2,184.96 | 2,389.12 | 3,475.08 | 586.42 | 790.58 | 1,876.54 |
| 8 | 106 UNITED NATIONS BANK | ATLANTA | GA | 7,212 | 3.69 | 134.00 | 266.13 | 362.77 | 396.66 | 576.96 | 96.64 | 130.54 | 310.84 |
| 9 | 024 WESTERN SAVINGS CO. | CLEVELAND | OH | 454,739 | 3.77 | 126.00 | 17,143.64 | 22,873.35 | 25,010.62 | 36,379.08 | 5,729.71 | 7,866.98 | 19,235.44 |
| 10 | 484 APPLE BANK | ERIE | PA | 6,220 | 3.78 | 125.00 | 235.11 | 312.86 | 342.09 | 497.59 | 77.75 | 106.98 | 262.48 |
| 11 | 182 BANK WITH U.S. | CINCINNATI | OH | 328,623 | 3.90 | 113.00 | 12,816.31 | 16,529.75 | 18,074.28 | 26,289.86 | 3,713.44 | 5,257.97 | 13,473.56 |
| 12 | 050 THE BANK OF NASHVILLE | NASHVILLE | TN | 32,090 | 4.00 | 103.00 | 1,283.62 | 1,614.15 | 1,764.97 | 2,567.23 | 330.53 | 481.36 | 1,283.62 |
| 13 | 852 SOUTHERN BANK | LEXINGTON | KY | 2,462 | 4.10 | 93.00 | 100.92 | 123.81 | 135.38 | 196.92 | 22.89 | 34.46 | 96.00 |
| 14 | 854 NEBRASKA TRUST | HODGENVILLE | KY | 13,934 | 4.19 | 84.00 | 583.83 | 700.87 | 766.36 | 1,114.70 | 117.04 | 182.53 | 530.88 |
| 15 | 853 MIDWESTERN TRUST CO | MIDDLESBORO | KY | 8,407 | 4.25 | 78.00 | 357.31 | 422.88 | 462.40 | 672.58 | 65.58 | 105.09 | 315.27 |
| 16 | 242 THE BANK OF CLEVELAND | CLEVELAND | OH | 748,602 | 4.26 | 77.18 | 31,876.96 | 37,654.66 | 41,173.09 | 59,888.13 | 5,777.71 | 9,296.14 | 28,011.18 |
| 17 | 493 NCP BANK | LOUISVILLE | KY | 156,407 | 4.28 | 75.00 | 6,694.20 | 7,867.25 | 8,602.36 | 12,512.52 | 1,173.05 | 1,908.16 | 5,818.32 |
| 18 | 013 EASTERN SAVINGS CO. | CLEVELAND | OH | 10,618 | 4.38 | 65.00 | 465.08 | 534.10 | 584.00 | 849.46 | 69.02 | 118.92 | 384.38 |
| 19 | 211 COMMERCIAL BANK | DETROIT | MI | 6,720 | 4.60 | 43.00 | 309.12 | 338.01 | 369.60 | 537.59 | 28.90 | 60.48 | 228.48 |
| 20 | 567 SOUTHERN UNION BANK | MEMPHIS | TN | 7,374 | 4.80 | 23.00 | 353.96 | 370.92 | 405.58 | 589.94 | 16.96 | 51.62 | 235.98 |
| 21 | 857 KEY TRUST | EAST LIVERPOOL | OH | 10,976 | 4.89 | 14.00 | 536.72 | 552.09 | 603.67 | 878.07 | 15.37 | 66.95 | 341.35 |
| 22 | 850 BANK OF ENGLAND | LONDON | | 4,533 | 5.12 | | 231.87 | 228.02 | 249.32 | 362.65 | -3.85 | 17.45 | 130.78 |
| | | | | 1,928,185 | 3.59 | | 76,288.78 | 96,987.69 | 106,050.15 | 154,254.77 | 20,702.76 | 29,761.38 | 77,965.99 |

Total Reserved
Non Earning Asset:  214,328
Actual Collected:  2,142,513
Actual Yield %:  3.56%

Legend

| Basis Points Shared | Color |
|---|---|
| 200 and over | Red |
| 100 to 199 | Light Purple |
| 26 to 99 | Green |
| 1 to 25 | Blue |
| 0 | |

Fig. 3

Earnings Credit And Negative Collected Rates

SUPER-CON STORES
10/31/1999

| # | Bank | Bank Name | City | State | Average Investable | EC | Basis Points | Income Lost On Earn Cr | Negative Collected Balance | Negative Collected Rate | Negative Collected Charge | Negative Charge at Prime | Negative Charge at Earn Cr | NSF Charges | Uncollected Fund Charges |
|---|---|---|---|---|---|---|---|---|---|---|---|---|---|---|---|
| 1 | 849 | NORTHERN TRUST BANK KY | CAMPBELLSVILLE | KY | 3,830 | 0.00 | 503.00 | 192.65 | 0 | 0 | 0 | 0 | 0 | | |
| 2 | 858 | KEY UNION BANK | CLEVELAND | OH | 38,538 | 0.59 | 444.00 | 1,711.09 | 6,930 | 0 | 0 | 0 | 0 | | |
| 3 | 856 | SKY TRUST | AKRON | OH | 10,161 | 1.99 | 304.00 | 308.90 | 0 | 0 | 0 | 0 | 0 | | |
| 4 | 851 | NATIONAL BANK | LOUISVILLE | KY | 3,374 | 2.30 | 273.00 | 92.10 | 0 | 0 | 0 | 0 | 0 | | |
| 5 | 251 | MIDWESTERN BANK ONE | YOUNGSTOWN | OH | 21,456 | 3.00 | 203.00 | 435.56 | 0 | 0 | 0 | 0 | 0 | | |
| 6 | 741 | NORTHERN TRUST BANK | KNOXVILLE | TN | 8,471 | 3.36 | 167.00 | 141.46 | 0 | 0 | 0 | 0 | 0 | 20.00 | |
| 7 | 855 | TRISTAR BANK | CLEVELAND | OH | 43,439 | 3.68 | 135.00 | 586.42 | 0 | 0 | 0 | 0 | 0 | | |
| 8 | 106 | UNITED NATIONS BANK | ATLANTA | GA | 7,212 | 3.69 | 134.00 | 96.64 | 0 | 0 | 0 | 0 | 0 | | |
| 9 | 024 | WESTERN SAVINGS CO. | CLEVELAND | OH | 454,739 | 3.77 | 126.00 | 5,729.71 | 30,658 | 11.00 | 281.03 | 198.00 | 96.32 | 26.00 | 25.00 |
| 10 | 484 | APPLE BANK | ERIE | PA | 6,220 | 3.78 | 125.00 | 77.75 | 0 | 0 | 0 | 0 | 0 | | |
| 11 | 182 | BANK WITH U.S. | CINCINNATI | OH | 328,623 | 3.90 | 113.00 | 3,713.44 | 0 | 0 | 0 | 0 | 0 | 25.00 | |
| 12 | 050 | THE BANK OF NASHVILLE | NASHVILLE | TN | 32,090 | 4.00 | 103.00 | 330.53 | 0 | 0 | 0 | 0 | 0 | | |
| 13 | 852 | SOUTHERN BANK | LEXINGTON | KY | 2,462 | 4.10 | 93.00 | 22.89 | 0 | 0 | 0 | 0 | 0 | | |
| 14 | 854 | NEBRASKA TRUST | HODGENVILLE | KY | 13,934 | 4.19 | 84.00 | 117.04 | 0 | 0 | 0 | 0 | 0 | | |
| 15 | 853 | MIDWESTERN TRUST CO | MIDDLESBORO | KY | 8,407 | 4.25 | 78.00 | 65.58 | 0 | 0 | 0 | 0 | 0 | | |
| 16 | 242 | THE BANK OF CLEVELAND | CLEVELAND | OH | 748,602 | 4.26 | 77.18 | 5,777.71 | 2,134,977 | 4.36 | 7763.31 | 13788.39 | 7575.97 | 75.00 | |
| 17 | 493 | NCP BANK | LOUISVILLE | KY | 156,407 | 4.28 | 75.00 | 1,173.05 | 0 | 0 | 0 | 0 | 0 | 50.00 | |
| 18 | 013 | EASTERN SAVINGS CO. | CLEVELAND | OH | 10,618 | 4.38 | 65.00 | 69.02 | 0 | 0 | 0 | 0 | 0 | | |
| 19 | 211 | COMMERCIAL BANK | DETROIT | MI | 6,720 | 4.60 | 43.00 | 28.90 | 0 | 0 | 0 | 0 | 0 | | |
| 20 | 567 | SOUTHERN UNION BANK | MEMPHIS | TN | 7,374 | 4.80 | 23.00 | 16.96 | 0 | 0 | 0 | 0 | 0 | | |
| 21 | 857 | KEY TRUST | EAST LIVERPOOL | OH | 10,976 | 4.89 | 14.00 | 15.37 | 0 | 0 | 0 | 0 | 0 | | |
| 22 | 850 | BANK OF ENGLAND | LONDON | KY | 4,533 | 5.12 | | -3.85 | 0 | 0 | 0 | 0 | 0 | | |
| | | | | | 1,928,185 | 3.59 | | 20,698.91 | 2,172,565 | | 8,044.34 | 14,031.15 | 7,675.69 | 196.00 | 25.00 |

Fig. 4

Legend

| Basis Points Showed | Color |
|---|---|
| 200 and over | Red |
| 100 to 199 | Light |
| 26 to 99 | Purpl |
| 1 to 25 | Gree |
| 0 | Blue |

Checks, Deposits And Float
*Sorted by Average Check Size*

SUPER-CON STORES
10/31/1999

| Bank | Bank | # Stores | Float | Average Float Per Store | Deposit Tickets | Avg | Mixed Deposits | Checks | In District | Out Of | Total | Two Day % | Total Checks | Daily Avg Chk Deposit | Total Floated Checks | Ttl Cks Dep Not On Us | Avg Check Size |
|---|---|---|---|---|---|---|---|---|---|---|---|---|---|---|---|---|
| 493 | NCP BANK | 36 | 11,425 | 317.36 | 933 | 26 | | 71 | 222 | 443 | 736 | 60.2% | 20 | 1 | 665 | 18 | 515.41 |
| 108 | UNITED NATIONS | 1 | 30 | 29.81 | 29 | 29 | | | | 2 | 2 | 100.0% | 2 | | 2 | 2 | 447.15 |
| 024 | WESTERN | 82 | 78,882 | 961.98 | 3997 | 49 | 5193 | 847 | 857 | 546 | 7443 | 7.3% | 91 | 3 | 6596 | 80 | 358.77 |
| 211 | COMMERCIAL | 3 | 187 | 62.18 | 123 | 41 | 24 | | | | 24 | 0.0% | 8 | | 24 | 8 | 233.19 |
| 741 | NORTHERN | 2 | 554 | 277.00 | 58 | 29 | | 3 | 88 | | 91 | 0.0% | 46 | 2 | 88 | 44 | 188.86 |
| 251 | MIDWESTERN | 2 | 59 | 29.44 | 89 | 45 | | | 11 | | 11 | 0.0% | 6 | | 11 | 6 | 160.55 |
| 567 | SOUTHERN UNION | 1 | 342 | 341.97 | 28 | 28 | | 12 | 50 | 22 | 84 | 26.2% | 84 | 3 | 72 | 72 | 142.49 |
| 050 | THE BANK OF | 4 | 1,522 | 380.50 | 147 | 37 | | 5 | 251 | 81 | 337 | 24.0% | 84 | 3 | 332 | 83 | 137.53 |
| 851 | NATIONAL BANK | 1 | 460 | 460.15 | 28 | 28 | | | 79 | 26 | 105 | 24.8% | 105 | 4 | 105 | 105 | 131.47 |
| 242 | THE BANK OF | 130 | 20,491 | 157.62 | 6166 | 47 | 1434 | 4582 | 2478 | 821 | 9315 | 8.8% | 72 | 2 | 4733 | 36 | 129.88 |
| 853 | MIDWESTERN | 1 | 1,135 | 1134.69 | 71 | 71 | | 193 | | 397 | 590 | 67.3% | 590 | 20 | 397 | 397 | 85.74 |
| 856 | SKY TRUST | 1 | 14 | 14.05 | 30 | 30 | 5 | | | | 5 | 0.0% | 5 | | 5 | 5 | 84.30 |
| 013 | EASTERN | 6 | 386 | 64.29 | 176 | 29 | 169 | | | | 169 | 0.0% | 28 | 1 | 169 | 28 | 68.47 |
| 182 | BANK WITH U.S. | 60 | 11,909 | 198.48 | 2496 | 42 | 6365 | | | | 6365 | 0.0% | 106 | 4 | 6365 | 106 | 56.13 |
| 855 | TRISTAR BANK | 17 | 1,228 | 72.25 | 718 | 42 | 857 | | | | 857 | 0.0% | 50 | 2 | 857 | 50 | 43.00 |
| 852 | SOUTHERN BANK | 1 | 19 | 19.00 | 22 | 22 | | 36 | 14 | | 50 | 0.0% | 50 | 2 | 14 | 14 | 40.71 |
| 484 | APPLE BANK | 1 | 51 | 51.00 | 6 | 6 | | 14 | 65 | | 79 | 2.9% | 79 | 3 | 65 | 65 | 23.54 |
| 849 | NORTHERN | 1 | 70 | 70.49 | 34 | 34 | | 64 | 101 | 5 | 170 | 0.0% | 170 | 6 | 106 | 106 | 19.95 |
| 854 | NEBRASKA | 1 | 1,441 | 1441.00 | 31 | 31 | 2921 | | | | 2921 | 0.0% | 2921 | 97 | 2921 | 2921 | 14.80 |
| 858 | KEY UNION BANK | 135 | 0 | 0.00 | 5254 | 39 | 299 | 1 | | 2610 | 2909 | 89.7% | 22 | 1 | 2909 | 22 | .00 |
| 850 | BANK OF | 1 | 0 | 0.00 | 31 | 31 | 28 | | | | 30 | 0.0% | 30 | | 29 | 29 | .00 |
| 857 | KEY TRUST | 5 | 47 | 9.34 | 177 | 35 | | | 1 | | | | | | | | .00 |
| Totals: | | 492 | 130,251 | 6,092.60 | 20,644 | 42 | 17,295 | 5,828 | 4,217 | 4,953 | 32,293 | 15.3% | | | 26465 | | |

Fig. 5

Breakdown By Service Charge Groups

SUPER-CON STORES
10/31/1999

| Bank | Bank Name | Annual Service Charges | Depository Costs (6a) | % Cost | Check Deposit Costs (6b) | % Cost | Data Info Costs (6c) | % Cost | Total | % of Total Service Charges |
|---|---|---|---|---|---|---|---|---|---|---|
| 1 013 | EASTERN SAVINGS CO. | 6,836.21 | 4,925.03 | 72.04% | 705.36 | 10.32% | 900.00 | 13.17% | 8,530.39 | 95.5% |
| 2 024 | WESTERN SAVINGS CO. | 180,422.05 | 114,717.96 | 63.58% | 19,488.90 | 10.80% | 22,780.32 | 12.63% | 156,987.18 | 87.0% |
| 3 050 | THE BANK OF NASHVILLE | 7,957.86 | 6,784.20 | 85.25% | 609.66 | 7.66% | 180.00 | 2.26% | 7,573.86 | 95.2% |
| 4 106 | UNITED NATIONS BANK | 2,551.20 | 2,384.40 | 93.46% | 2.76 | 0.11% | 144.00 | 5.64% | 2,531.16 | 99.2% |
| 5 182 | BANK WITH U.S. | 88,168.23 | 68,550.27 | 77.75% | 7,039.56 | 7.98% | 4,620.00 | 5.24% | 80,209.83 | 91.0% |
| 6 211 | COMMERCIAL BANK | 5,401.26 | 4,875.30 | 90.26% | 96.00 | 1.78% | 240.00 | 4.44% | 5,211.30 | 96.5% |
| 7 242 | THE BANK OF CLEVELAND | 206,033.76 | 85,680.00 | 41.59% | 12,193.86 | 5.92% | 6,948.00 | 3.37% | 104,821.86 | 50.9% |
| 8 251 | MIDWESTERN BANK ONE | 3,070.70 | 2,810.30 | 91.52% | 13.20 | 0.43% | 204.00 | 6.64% | 3,027.50 | 98.6% |
| 9 484 | APPLE BANK | 1,509.25 | 1,173.85 | 77.78% | 214.80 | 14.23% | 120.00 | 7.95% | 1,508.65 | 100.0% |
| 10 493 | NCP BANK | 55,515.79 | 48,407.16 | 87.20% | 1,176.67 | 2.12% | 4,188.00 | 7.54% | 53,771.83 | 96.9% |
| 11 567 | SOUTHERN UNION BANK | 857.16 | 548.40 | 63.98% | 99.36 | 11.59% | 168.00 | 19.60% | 815.76 | 95.2% |
| 12 741 | NORTHERN TRUST BANK | 3,916.32 | 2,989.20 | 76.33% | 325.44 | 8.31% | 312.00 | 7.97% | 3,626.64 | 92.6% |
| 13 849 | NORTHERN TRUST BANK KY | 594.00 | 374.40 | 63.03% | 122.40 | 20.61% | 60.00 | 10.10% | 556.80 | 93.7% |
| 14 850 | BANK OF ENGLAND | 321.40 | 0.00 | 0.00% | 169.00 | 52.58% | 120.00 | 37.34% | 289.00 | 89.9% |
| 15 851 | NATIONAL BANK | 193.32 | 26.88 | 13.90% | 88.20 | 45.62% | 60.00 | 31.04% | 175.08 | 90.6% |
| 16 852 | SOUTHERN BANK | 233.28 | 79.20 | 33.95% | 30.72 | 13.17% | 96.00 | 41.15% | 205.92 | 88.3% |
| 17 853 | MIDWESTERN TRUST CO | 1,293.36 | 204.48 | 15.81% | 945.60 | 73.11% | 72.00 | 5.57% | 1,222.08 | 94.5% |
| 18 854 | NEBRASKA TRUST | 2,209.61 | 167.16 | 7.57% | 2,041.25 | 92.38% | 0.00 | 0.00% | 2,208.41 | 99.9% |
| 19 855 | TRISTAR BANK | 14,617.68 | 12,792.00 | 87.51% | 1,007.04 | 6.89% | 780.00 | 5.34% | 14,579.04 | 99.7% |
| 20 856 | SKY TRUST | 512.88 | 126.00 | 24.57% | 6.00 | 1.17% | 156.00 | 30.42% | 288.00 | 56.2% |
| 21 857 | KEY TRUST | 1,418.40 | 1,274.40 | 89.85% | 0.00 | 0.00% | 120.00 | 8.46% | 1,394.40 | 98.3% |
| 22 858 | KEY UNION BANK | 102,676.32 | 24,127.80 | 23.50% | 7,007.88 | 6.83% | 27,121.56 | 26.41% | 58,257.24 | 56.7% |
| | Annual Totals: | 686,310.05 | 383,018.40 | 55.81% | 53,383.66 | 7.78% | 69,389.88 | 10.11% | 505,791.94 | 73.7% |

Fig. 6

SUPER-CON STORES
10/31/1999

Breakdown By User Supplied Groups

*Variable Information customized to the client.*

| Bank | Bank Name | Annual Service Charges | 60 - NIGHT BAGS | % Cost | Rolled Coin | % Cost | Return Checks | % Cost | Total | % of Total Service Charges |
|---|---|---|---|---|---|---|---|---|---|---|
| 1 013 | EASTERN SAVINGS CO. | 6,836.21 | 0.00 | 0.00% | 0.00 | 0.00% | 192.00 | 2.81% | 192.00 | 2.81% |
| 2 024 | WESTERN SAVINGS CO. | 180,422.05 | 34,064.64 | 18.88% | 0.00 | 0.00% | 3,192.00 | 1.77% | 37,256.64 | 20.65% |
| 3 050 | THE BANK OF NASHVILLE | 7,957.86 | 0.00 | 0.00% | 0.00 | 0.00% | 120.00 | 1.51% | 120.00 | 1.51% |
| 4 106 | UNITED NATIONS BANK | 2,551.20 | 0.00 | 0.00% | 0.00 | 0.00% | 0.00 | 0.00% | 0.00 | 0.00% |
| 5 182 | BANK WITH U.S. | 88,168.23 | 0.00 | 0.00% | 5,656.20 | 6.42% | 1,287.00 | 1.46% | 6,943.20 | 7.87% |
| 6 211 | COMMERCIAL BANK | 5,401.26 | 0.00 | 0.00% | 0.00 | 0.00% | 0.00 | 0.00% | 0.00 | 0.00% |
| 7 242 | THE BANK OF CLEVELAND | 206,033.76 | 0.00 | 0.00% | 4,590.60 | 2.23% | 2,052.00 | 1.00% | 6,642.60 | 3.22% |
| 8 251 | MIDWESTERN BANK ONE | 3,070.70 | 0.00 | 0.00% | 670.10 | 21.82% | 0.00 | 0.00% | 670.10 | 21.82% |
| 9 484 | APPLE BANK | 1,509.25 | 96.00 | 6.36% | 0.00 | 0.00% | 120.00 | 7.95% | 216.00 | 14.31% |
| 10 493 | NCP BANK | 55,515.79 | 5,616.00 | 10.12% | 2,114.40 | 3.81% | 108.00 | 0.19% | 7,838.40 | 14.12% |
| 11 567 | SOUTHERN UNION BANK | 857.16 | 252.00 | 29.40% | 0.00 | 0.00% | 0.00 | 0.00% | 252.00 | 29.40% |
| 12 741 | NORTHERN TRUST BANK | 3,916.32 | 0.00 | 0.00% | 48.00 | 1.23% | 108.00 | 2.76% | 156.00 | 3.98% |
| 13 849 | NORTHERN TRUST BANK KY | 594.00 | 120.00 | 20.20% | 152.40 | 25.66% | 0.00 | 0.00% | 272.40 | 45.86% |
| 14 850 | BANK OF ENGLAND | 321.40 | 0.00 | 0.00% | 0.00 | 0.00% | 0.00 | 0.00% | 0.00 | 0.00% |
| 15 851 | NATIONAL BANK | 193.32 | 0.00 | 0.00% | 0.00 | 0.00% | 0.00 | 0.00% | 0.00 | 0.00% |
| 16 852 | SOUTHERN BANK | 233.28 | 0.00 | 0.00% | 0.00 | 0.00% | 0.00 | 0.00% | 0.00 | 0.00% |
| 17 853 | MIDWESTERN TRUST CO | 1,293.36 | 0.00 | 0.00% | 0.00 | 0.00% | 96.00 | 7.42% | 96.00 | 7.42% |
| 18 854 | NEBRASKA TRUST | 2,209.61 | 0.00 | 0.00% | 155.16 | 7.02% | 1,200.00 | 54.31% | 1,355.16 | 61.33% |
| 19 855 | TRISTAR BANK | 14,617.68 | 0.00 | 0.00% | 199.20 | 1.36% | 360.00 | 2.46% | 559.20 | 3.83% |
| 20 856 | SKY TRUST | 512.88 | 0.00 | 0.00% | 0.00 | 0.00% | 0.00 | 0.00% | 0.00 | 0.00% |
| 21 857 | KEY TRUST | 1,418.40 | 0.00 | 0.00% | 0.00 | 0.00% | 0.00 | 0.00% | 0.00 | 0.00% |
| 22 858 | KEY UNION BANK | 102,676.32 | 19,752.00 | 19.24% | 0.00 | 0.00% | 2,376.00 | 2.31% | 22,128.00 | 21.55% |
| | Annual Totals: | 686,310.05 | 13,586.06 | 1.98% | 59,900.64 | 8.73% | 11,211.00 | 1.63% | 84,697.70 | 12.34% |

Fig. 7

Unit Price Summary (excerpt)

| Service | Service Description | Monthly Totals | Yearly | Average | Weighted Average |
|---|---|---|---|---|---|
| 00211 | CHK ENCODING CHARGE | | | 0.015 | 0.075 |
| 00249 | CHKS UNENC MIXED | 1,251.17 | 15,014.03 | 0.1294 | 0.0913 |
| 00250 | CHKS UNENC IN DIST | 124.76 | 1,497.08 | 0.0899 | 0.0827 |
| 00251 | CHKS UNENC LOCAL | 31.33 | 375.93 | 0.0863 | 0.0796 |
| 00255 | CHKS UNENC ON US | 458.18 | 5,498.21 | 0.0745 | 0.0915 |
| 00256 | CHKS UNENC CLG HSE | 58.63 | 703.56 | 0.09 | 0.1132 |
| 00257 | CHKS UNENC OUT DIST | 449.20 | 5,390.40 | 0.1094 | 0.10 |
| 00258 | CHKS DEP UNENC RCPC | 60.00 | 720.00 | 0.10 | 1.00 |
| 00259 | FOOD COUPONS | 3.00 | 36.00 | 1.00 | 0.22 |
| 00260 | CHKS ENC REJECTED | 17.16 | 205.92 | 0.22 | 3.7221 |
| 00265 | RETURN ITEM | 934.25 | 11,211.00 | 4.4375 | 2.7251 |
| 00270 | RETURN ITEM REDEPOSITED | 466.00 | 5,592.00 | 2.5556 | 0.10 |
| 00272 | RETURN ITEM REDEP TRANSIT | 0.10 | 1.20 | 0.10 | 0.10 |
| 00278 | RETURN ITEM MAKER REQ | 0.30 | 3.60 | 0.10 | 1.00 |
| 00279 | RETURN ITEM DUPLICATE ADVICE | 6.00 | 72.00 | 1.00 | 0.3333 |
| 00284 | RETURN ITEM ALTERNATE ADDRESS | 12.00 | 144.00 | 0.75 | 0.058 |
| 00305 | COIN ORDERED VAULT | 651.55 | 7,818.60 | 0.0767 | 0.0511 |
| 00306 | COIN ORDERED BRANCH | 480.62 | 5,767.46 | 0.0583 | 50.00 |
| 00315 | CONCENTRATION MAINT | 50.00 | 600.00 | 50.00 | 0.0005 |
| 00340 | CURR DEP STANDARD | 13,295.94 | 159,551.32 | 0.8208 | 0.0004 |
| 00341 | CURR DEP VAULT | 1,982.75 | 23,793.00 | 0.35 | 0.0005 |
| 00342 | DEP IMMED VER 1,000 | 1,768.50 | 21,222.00 | 0.50 | 2.00 |
| 00343 | BRANCH DEPOSIT IN NON-STD BAG | 90.00 | 1,080.00 | 2.00 | 0.30 |
| 00362 | CURR DEP FULL STRAP | 17.70 | 212.40 | 0.30 | 15.00 |
| 00370 | CURR DEPOSIT CHARGE | 165.00 | 1,980.00 | 15.00 | 0.0001 |
| 00395 | CURR PROVIDED STANDARD | 7.50 | 90.00 | 0.06 | 0.30 |
| 00405 | CURR PROVIDED STRAP | 0.60 | 7.20 | 0.30 | 0.2964 |
| 00406 | CURR PROVIDED BRANCH | 16.30 | 195.60 | 0.275 | 0.1868 |
| 00420 | DEBIT - CHECK PAID | 16.25 | 195.00 | 0.1671 | 0.08 |
| 00423 | CHECKS PAID | 1,328.56 | 15,942.72 | 0.08 | 0.2621 |
| 00425 | DEP TICKETS | 5,361.63 | 64,339.56 | 0.3296 | 3.00 |
| 00426 | DEP CORRECTION | 30.00 | 360.00 | 3.00 | 0.22 |
| 00432 | NIGHT BAG DISP PURCHASE | 5.72 | 68.64 | 0.22 | 53.75 |
| 00434 | DEP. RECON MAINT | 215.00 | 2,580.00 | 55.00 | 0.0625 |
| 00437 | DEP. RECON ITEMS | 208.23 | 2,498.70 | 10.041 | 2.36 |
| 00465 | FDIC CHARGE | 16.52 | 198.24 | 2.36 | |

*These costs reflect the total charges incurred for ALL banks client is associated.*

Fig. 8

Deposit Ticket

Sorted By Break Even Deposit

SUPER-CON STORES
10/31/1999

| | Bank | Bank | 1 Dep | 2 Unit | 3 Cost | 4 BAI | 5 Unit | 6 Cost | 7 BAI Other | 8 Dep Recon | 9 Unit | 10 Dep Recon Cost | 11 Dep Recon Other | 12 Dep Reorder | 13 Unit | 14 Dep Reorder | 15 Night | 16 Unit | 17 Continued.. Night Bags |
|---|---|---|---|---|---|---|---|---|---|---|---|---|---|---|---|---|---|---|---|
| 1 | 211 | COMMERCIAL | 123 | 1.25 | 153.75 | 0 | | 0.00 | 0 | 124 | 0.61 | 75.46 | 65.00 | | | 0.00 | 0 | | 0.00 |
| 2 | 484 | APPLE BANK | 6 | 0.50 | 3.00 | 0 | | 0.00 | 0 | 0 | | 0.00 | 0.00 | | | 0.00 | 4 | 2.00 | 8.00 |
| 3 | 024 | WESTERN | 3997 | 0.5076 | 2028.70 | 5020 | 0.2321 | 1165.36 | 1215.3 | 423 | 0.26 | 108.42 | 100.00 | | | 0.00 | 978 | 2.90 | 2838.72 |
| 4 | 493 | NCP BANK | 933 | 0.50 | 466.50 | 887 | 0.2086 | 185.10 | 185.1 | 749 | 0.12 | 87.40 | 50.00 | | | 0.00 | 234 | 2.00 | 468.00 |
| 5 | 567 | SOUTHERN UNION | 28 | 0.25 | 7.00 | 0 | | 0.00 | 0 | 0 | | 0.00 | 0.00 | | | 0.00 | 6 | 3.50 | 21.00 |
| 6 | 013 | EASTERN SAVINGS | 176 | 0.40 | 70.40 | 181 | 0.3408 | 61.70 | 61.7 | 0 | | 0.00 | 0.00 | | | 0.00 | 0 | | 0.00 |
| 7 | 858 | KEY UNION BANK | 5254 | 0.05 | 262.70 | 11470 | 0.1261 | 1446.70 | 1518.7 | 2039 | 0.05 | 101.95 | 0.00 | | | 0.00 | 823 | 2.00 | 1646.00 |
| 8 | 857 | KEY TRUST | 177 | 0.60 | 106.20 | 0 | | 0.00 | 0 | 0 | | 0.00 | 0.00 | | | 0.00 | 0 | | 0.00 |
| 9 | 182 | BANK WITH U.S. | 2496 | 0.30 | 748.80 | 6988 | 0.1042 | 728.83 | 728.83 | 0 | | 0.00 | 0.00 | | | 0.00 | 3 | | 0.00 |
| 10 | 849 | NORTHERN TRUST | 34 | 0.25 | 8.50 | 0 | | 0.00 | 0 | 1 | 50.00 | 50.00 | 0.00 | | | 0.00 | 1 | 10.00 | 10.00 |
| 11 | 855 | TRISTAR BANK | 718 | 0.35 | 251.30 | 0 | | 0.00 | 0 | 0 | | 0.00 | 0.00 | | | 0.00 | 0 | | 0.00 |
| 12 | 856 | SKY TRUST | 30 | 0.35 | 10.50 | 0 | | 0.00 | 0 | 0 | | 0.00 | 0.00 | | | 0.00 | 0 | | 0.00 |
| 13 | 106 | UNITED NATIONS | 29 | 0.35 | 10.15 | 0 | | 0.00 | 0 | 0 | | 0.00 | 0.00 | | | 0.00 | 0 | | 0.00 |
| 14 | 242 | THE BANK OF | 6166 | 0.20 | 1233.20 | 6233 | 0.1095 | 683.10 | 683.1 | 0 | | 0.00 | 0.00 | | | 0.00 | 0 | | 0.00 |
| 15 | 050 | THE BANK OF | 147 | 0.30 | 44.10 | 0 | | 0.00 | 0 | 0 | | 0.00 | 0.00 | | | 0.00 | 0 | | 0.00 |
| 16 | 852 | SOUTHERN BANK | 22 | 0.30 | 6.60 | 0 | | 0.00 | 0 | 0 | | 0.00 | 0.00 | | | 0.00 | 20 | | 0.00 |
| 17 | 741 | NORTHERN TRUST | 58 | 0.25 | 14.50 | 0 | | 0.00 | 0 | 0 | | 0.00 | 0.00 | | | 0.00 | 0 | | 0.00 |
| 18 | 853 | MIDWESTERN | 71 | 0.24 | 17.04 | 0 | | 0.00 | 0 | 0 | | 0.00 | 0.00 | | | 0.00 | 0 | | 0.00 |
| 19 | 251 | MIDWESTERN BANK | 89 | 0.15 | 13.35 | 0 | | 0.00 | 0 | 0 | | 0.00 | 0.00 | | | 0.00 | 0 | | 0.00 |
| 20 | 851 | NATIONAL BANK | 28 | 0.08 | 2.24 | 0 | | 0.00 | 0 | 0 | | 0.00 | 0.00 | | | 0.00 | 0 | | 0.00 |
| 21 | 854 | NEBRASKA TRUST | 31 | | 0.00 | 0 | | 0.00 | 0 | 0 | | 0.00 | 0.00 | | | 0.00 | 0 | | 0.00 |
| 22 | 850 | BANK OF ENGLAND | 31 | | 0.00 | 0 | | 0.00 | 0 | 0 | | 0.00 | 0.00 | | | 0.00 | 0 | | 0.00 |
| | | | 20644 | | 5458.53 | 30779 | | 4270.79 | 4392.7 | 3336 | | 423.23 | 215.00 | 0 | | 0.00 | 2069 | | 4991.72 |
| | Annual Totals: | | 247728 | | 65,502 | 369348 | | 51,249 | 52713. | 40,032 | | 5078.70 | 2580.00 | | | | 24828 | | 59,901 |

Fig. 9 (part 1)

SUPER-CON STORES
10/31/1999

Deposit Ticket
Sorted By Break Even Deposit

| | Bank | Bank | Total | Unit | Annual | Break Even | 5.00% Return | Potential Daily | | | |
|---|---|---|---|---|---|---|---|---|---|---|---|
| | | | 18 | 19 | 20 | 9b | 22 | 10000 23 | 5000 24 | 2500 25 | 1000 26 |
| 1 | 211 | COMMERCIAL | 229.21 | 1.86 | 680.16 | 13603.22 | 680.16 | 0.49 | 1.18 | 1.52 | 1.73 |
| 2 | 484 | APPLE BANK | 11.00 | 1.83 | 669.17 | 13383.33 | 669.17 | 0.46 | 1.15 | 1.49 | 1.70 |
| 3 | 024 | WESTERN | 6141.20 | 1.54 | 560.81 | 11216.10 | 560.81 | 0.17 | 0.85 | 1.19 | 1.40 |
| 4 | 493 | NCP BANK | 1207.00 | 1.29 | 472.19 | 9443.84 | 472.19 | -0.08 | 0.61 | 0.95 | 1.16 |
| 5 | 567 | SOUTHERN UNION | 28.00 | 1.00 | 365.00 | 7300.00 | 365.00 | -0.37 | 0.32 | 0.66 | 0.86 |
| 6 | 013 | EASTERN SAVINGS | 132.10 | 0.75 | 273.96 | 5479.15 | 273.96 | -0.62 | 0.07 | 0.41 | 0.61 |
| 7 | 858 | KEY UNION BANK | 3457.35 | 0.66 | 240.19 | 4803.70 | 240.19 | -0.71 | -0.03 | 0.32 | 0.52 |
| 8 | 857 | KEY TRUST | 106.20 | 0.60 | 219.00 | 4380.00 | 219.00 | -0.77 | -0.08 | 0.26 | 0.46 |
| 9 | 182 | BANK WITH U.S. | 1477.63 | 0.59 | 216.08 | 4321.59 | 216.08 | -0.78 | -0.09 | 0.25 | 0.46 |
| 10 | 849 | NORTHERN TRUST | 18.50 | 0.54 | 198.60 | 3972.06 | 198.60 | -0.83 | -0.14 | 0.20 | 0.41 |
| 11 | 855 | TRISTAR BANK | 301.30 | 0.42 | 153.17 | 3063.36 | 153.17 | -0.95 | -0.27 | 0.08 | 0.28 |
| 12 | 856 | SKY TRUST | 10.50 | 0.35 | 127.75 | 2555.00 | 127.75 | -1.02 | -0.33 | 0.01 | 0.21 |
| 13 | 106 | UNITED NATIONS | 10.15 | 0.35 | 127.75 | 2555.00 | 127.75 | -1.02 | -0.33 | 0.01 | 0.17 |
| 14 | 242 | THE BANK OF | 1916.30 | 0.31 | 113.44 | 2268.73 | 113.44 | -1.06 | -0.37 | -0.03 | 0.17 |
| 15 | 050 | THE BANK OF | 44.10 | 0.30 | 109.50 | 2190.00 | 109.50 | -1.07 | -0.38 | -0.04 | 0.16 |
| 16 | 852 | SOUTHERN BANK | 6.60 | 0.30 | 109.50 | 2190.00 | 109.50 | -1.07 | -0.38 | -0.04 | 0.16 |
| 17 | 741 | NORTHERN TRUST | 14.50 | 0.25 | 91.25 | 1825.00 | 91.25 | -1.12 | -0.43 | -0.09 | 0.11 |
| 18 | 853 | MIDWESTERN | 17.04 | 0.24 | 87.60 | 1752.00 | 87.60 | -1.13 | -0.44 | -0.10 | 0.10 |
| 19 | 251 | MIDWESTERN BANK | 13.35 | 0.15 | 54.75 | 1095.00 | 54.75 | -1.22 | -0.53 | -0.19 | 0.01 |
| 20 | 851 | NATIONAL BANK | 2.24 | 0.08 | 29.20 | 584.00 | 29.20 | -1.29 | -0.60 | -0.26 | -0.06 |
| 21 | 854 | NEBRASKA TRUST | 0.00 | 0.00 | 0.00 | 0.00 | 0.00 | -1.37 | -0.68 | -0.34 | -0.14 |
| 22 | 850 | BANK OF ENGLAND | 0.00 | 0.00 | 0.00 | 0.00 | 0.00 | -1.37 | -0.68 | -0.34 | -0.14 |
| | | | 15144.27 | | | | | | | | |

Annual Totals:   181,731

*Potential monies lost daily if Break Even deposit is not met.*

Fig. 9 (part 2)

SUPER-CON STORES
10/31/1999

Cash Activity Costs

| | Bank | Bank | 1<br># Stores | 2<br>Cash Dep | 3<br>Cost | 4<br>Total | 5<br>Cash Dep | 6<br>Cost | 7<br>Total | 8<br>Cash Dep | 9<br>Cost | 10<br>Total | 11<br>Other Cash | 12<br>Cost | 13<br>Total | 14<br>Avg Cash Store | 15<br>Cash Order | 16<br>Rolled Coin | 17<br>Box |
|---|---|---|---|---|---|---|---|---|---|---|---|---|---|---|---|---|---|---|---|
| 1 | 013 | EASTERN SAVINGS | 6 | 481,456 | 0.70 | 337.02 | 0 | 0.00 | 0.00 | 0 | 0.00 | 0.00 | 0 | 0.00 | 0.00 | 80243 | 0.00 | 0.00 | 0.00 |
| 2 | 024 | WESTERN SAVINGS | 82 | 9,839,700 | 0.45 | 4454.03 | 0 | 0.00 | 0.00 | 0 | 0.00 | 0.00 | 1 | 130.9 | 130.96 | 119996 | 0.00 | 0.00 | 0.00 |
| 3 | 050 | THE BANK OF | 4 | 417,000 | 1.25 | 521.25 | 0 | 0.00 | 0.00 | 0 | 0.00 | 0.00 | 0 | 0.00 | 0.00 | 104250 | 0.00 | 0.00 | 0.00 |
| 4 | 106 | UNITED NATIONS | 1 | 125,700 | 1.50 | 188.55 | 0 | 0.00 | 0.00 | 0 | 0.00 | 0.00 | 0 | 0.00 | 0.00 | 125700 | 0.00 | 0.00 | 0.00 |
| 5 | 182 | BANK WITH U.S. | 60 | 7,442,288 | 0.60 | 4465.37 | 0 | 0.00 | 0.00 | 0 | 0.00 | 0.00 | 0 | 0.00 | 0.00 | 124038 | 0.00 | 471.35 | 0.00 |
| 6 | 211 | COMMERCIAL BANK | 3 | 177,070 | 1.00 | 177.07 | 0 | 0.00 | 0.00 | 0 | 0.00 | 0.00 | 0 | 0.00 | 0.00 | 59023 | 0.00 | 0.00 | 0.00 |
| 7 | 242 | THE BANK OF | 130 | 13,126,000 | 0.41 | 5418.95 | 0 | 0.00 | 0.00 | 0 | 0.00 | 0.00 | 0 | 0.00 | 0.00 | 100969 | 0.00 | 382.55 | 0.00 |
| 8 | 251 | MIDWESTERN BANK | 2 | 0 | 0.00 | 0.00 | 0 | 0.00 | 0.00 | 0 | 0.00 | 0.00 | 45 | 2.00 | 90.00 | 0 | 0.00 | 55.84 | 0.00 |
| 9 | 484 | APPLE BANK | 1 | 86,821 | 1.00 | 86.82 | 0 | 0.00 | 0.00 | 0 | 0.00 | 0.00 | 11 | 15.00 | 165.00 | 86821 | 0.00 | 0.00 | 0.00 |
| 10 | 493 | NCP BANK | 36 | 2,835,830 | 1.00 | 2835.83 | 0 | 0.00 | 0.00 | 0 | 0.00 | 0.00 | 0 | 0.00 | 0.00 | 78773 | 0.00 | 176.20 | 0.00 |
| 11 | 567 | SOUTHERN UNION | 1 | 0 | 0.00 | 0.00 | 59 | 0.30 | 17.70 | 0 | 0.00 | 0.00 | 0 | 0.00 | 0.00 | 0 | 0.00 | 0.00 | 0.00 |
| 12 | 741 | NORTHERN TRUST | 2 | 230,000 | 1.00 | 230.00 | 0 | 0.00 | 0.00 | 0 | 0.00 | 0.00 | 0 | 0.00 | 0.00 | 115000 | 0.60 | 4.00 | 0.00 |
| 13 | 849 | NORTHERN TRUST | 1 | 0 | 0.00 | 0.00 | 0 | 0.00 | 0.00 | 0 | 0.00 | 0.00 | 0 | 0.00 | 0.00 | 0 | 0.00 | 12.70 | 0.00 |
| 14 | 850 | BANK OF ENGLAND | 1 | 0 | 0.00 | 0.00 | 0 | 0.00 | 0.00 | 0 | 0.00 | 0.00 | 0 | 0.00 | 0.00 | 0 | 0.00 | 0.00 | 0.00 |
| 15 | 851 | NATIONAL BANK | 1 | 0 | 0.00 | 0.00 | 0 | 0.00 | 0.00 | 0 | 0.00 | 0.00 | 0 | 0.00 | 0.00 | 0 | 0.00 | 0.00 | 0.00 |
| 16 | 852 | SOUTHERN BANK | 1 | 0 | 0.00 | 0.00 | 0 | 0.00 | 0.00 | 0 | 0.00 | 0.00 | 0 | 0.00 | 0.00 | 0 | 0.00 | 0.00 | 0.00 |
| 17 | 853 | MIDWESTERN TRUST | 1 | 0 | 0.00 | 0.00 | 0 | 0.00 | 0.00 | 0 | 0.00 | 0.00 | 0 | 0.00 | 0.00 | 0 | 0.00 | 12.93 | 0.00 |
| 18 | 854 | NEBRASKA TRUST | 1 | 0 | 0.00 | 0.00 | 0 | 0.00 | 0.00 | 0 | 0.00 | 0.00 | 0 | 0.00 | 0.00 | 0 | 0.00 | 16.60 | 0.00 |
| 19 | 855 | TRISTAR BANK | 17 | 0 | 0.00 | 0.00 | 0 | 0.00 | 0.00 | 0 | 0.00 | 0.00 | 1 | 748.1 | 748.10 | 0 | 0.00 | 0.00 | 0.00 |
| 20 | 856 | SKY TRUST | 1 | 0 | 0.00 | 0.00 | 0 | 0.00 | 0.00 | 0 | 0.00 | 0.00 | 0 | 0.00 | 0.00 | 0 | 0.00 | 0.00 | 0.00 |
| 21 | 857 | KEY TRUST | 5 | 0 | 0.00 | 0.00 | 0 | 0.00 | 0.00 | 0 | 0.00 | 0.00 | 0 | 0.00 | 0.00 | 0 | 0.00 | 0.00 | 0.00 |
| 22 | 858 | KEY UNION BANK | 135 | 3,391,977 | 0.00 | 0.00 | 0 | 0.00 | 0.00 | 0 | 0.00 | 0.00 | 0 | 0.00 | 0.00 | 25126 | 0.60 | 1132.17 | 0.00 |
| Total # of Stores: | | 492 | | 38,153,842 | | 18714.89 | 59 | | 17.70 | 0 | | 0.00 | 58 | | 1134.06 | | 0.60 | 1132.17 | 0.00 |
| Annual Totals: | | | | 457,846,104 | | 224578.72 | 708 | | 212.40 | 0 | | 0.00 | 696 | | 13608.72 | | 7.20 | 13586.06 | |

Total Cash: 19,866.65  
Annual Totals: 238,399.84

Total Coin: 1,132.77  
Annual Totals: 13,593.26

Fig. 10

Banking Activity (Transactions)

SUPER-CON STORES
10/31/1999

| Bank | Bank | City | State | # Stores | Deposit | BAI Detail | Dep | Dep Errors | Checks | Cash | Night | Cash Ord | Rolled | Box | Return | Return Checks | Return Check Buyback | NSF UNC |
|---|---|---|---|---|---|---|---|---|---|---|---|---|---|---|---|---|---|---|
| 1 | 013 | EASTERN SAVINGS | CLEVELAND | OH | 6 | 176 | 181 | 0 | 0 | 176 | 481456 | 0 | 0 | 0 | 0 | 2 | 5 | 0 | 0 |
| 2 | 024 | WESTERN SAVINGS | CLEVELAND | OH | 82 | 3997 | 5020 | 423 | 2 | 7599 | 9839700 | 978 | 0 | 0 | 0 | 38 | 47 | 0 | 2 |
| 3 | 050 | THE BANK OF | NASHVILLE | TN | 4 | 147 | 0 | 0 | 0 | 341 | 417000 | 0 | 0 | 0 | 0 | 2 | 2 | 0 | 1 |
| 4 | 106 | UNITED NATIONS | ATLANTA | GA | 1 | 29 | 0 | 0 | 0 | 3 | 125700 | 0 | 0 | 0 | 0 | 0 | 1 | 0 | 0 |
| 5 | 182 | BANK WITH U.S. | CINCINNATI | OH | 60 | 2496 | 6988 | 0 | 0 | 6438 | 7442288 | 0 | 0 | 9427 | 0 | 39 | 34 | 0 | 0 |
| 6 | 211 | COMMERCIAL BANK | DETROIT | MI | 3 | 123 | 0 | 124 | 0 | 25 | 177070 | 3 | 0 | 0 | 0 | 0 | 0 | 0 | 3 |
| 7 | 242 | THE BANK OF | CLEVELAND | OH | 130 | 6166 | 6233 | 0 | 1 | 9419 | 13126000 | 0 | 0 | 7651 | 0 | 57 | 47 | 0 | 0 |
| 8 | 251 | MIDWESTERN BANK | YOUNGSTOWN | OH | 2 | 89 | 0 | 0 | 0 | 11 | 0 | 0 | 0 | 908 | 0 | 0 | 0 | 0 | 0 |
| 9 | 484 | APPLE BANK | ERIE | PA | 1 | 6 | 0 | 0 | 0 | 80 | 86821 | 4 | 0 | 0 | 0 | 1 | 0 | 0 | 2 |
| 10 | 493 | NCP BANK | LOUISVILLE | KY | 36 | 933 | 887 | 749 | 1 | 745 | 2835830 | 234 | 0 | 1762 | 0 | 3 | 0 | 0 | 0 |
| 11 | 567 | SOUTHERN UNION | MEMPHIS | TN | 1 | 28 | 0 | 0 | 0 | 84 | 0 | 6 | 0 | 0 | 0 | 0 | 0 | 0 | 1 |
| 12 | 741 | NORTHERN TRUST | KNOXVILLE | TN | 2 | 58 | 0 | 0 | 0 | 101 | 230000 | 20 | 2 | 50 | 0 | 3 | 1 | 0 | 0 |
| 13 | 849 | NORTHERN TRUST | CAMPBELLSVILLE | KY | 1 | 34 | 0 | 0 | 0 | 170 | 0 | 1 | 0 | 254 | 0 | 0 | 0 | 0 | 0 |
| 14 | 850 | BANK OF ENGLAND | LONDON | KY | 1 | 31 | 0 | 0 | 0 | 30 | 0 | 0 | 0 | 0 | 0 | 0 | 0 | 0 | 0 |
| 15 | 851 | NATIONAL BANK | LOUISVILLE | KY | 1 | 28 | 0 | 0 | 0 | 105 | 0 | 0 | 0 | 0 | 0 | 0 | 0 | 0 | 0 |
| 16 | 852 | SOUTHERN BANK | LEXINGTON | KY | 1 | 22 | 0 | 0 | 0 | 50 | 0 | 0 | 0 | 0 | 0 | 0 | 0 | 0 | 0 |
| 17 | 853 | MIDWESTERN TRUST | MIDDLESBORO | KY | 1 | 71 | 0 | 0 | 0 | 598 | 0 | 0 | 0 | 0 | 0 | 8 | 0 | 0 | 0 |
| 18 | 854 | NEBRASKA TRUST | HODGENVILLE | KY | 1 | 31 | 0 | 1 | 0 | 2941 | 0 | 0 | 0 | 431 | 0 | 20 | 1 | 0 | 0 |
| 19 | 855 | TRISTAR BANK | CLEVELAND | OH | 17 | 718 | 0 | 0 | 0 | 870 | 0 | 0 | 0 | 166 | 0 | 12 | 0 | 0 | 0 |
| 20 | 856 | SKY TRUST | AKRON | OH | 1 | 30 | 0 | 0 | 0 | 5 | 0 | 0 | 0 | 0 | 0 | 0 | 0 | 0 | 0 |
| 21 | 857 | KEY TRUST | EAST LIVERPOOL | OH | 5 | 177 | 11470 | 2039 | 0 | 3008 | 3391977 | 823 | 0 | 0 | 0 | 66 | 33 | 0 | 0 |
| 22 | 858 | KEY UNION BANK | CLEVELAND | OH | 135 | 5254 | 30779 | 3336 | 4 | 32,799 | 38,153,842 | 2069 | 2 | 20649 | 0 | 251 | 171 | 0 | 9 |
| | | | | 492 | 20644 | | | | | | | | | | | | | | |
| | | Annual | | | 247728 | 369348 | 40032 | 48 | 393,588 | 457,846,104 | 24828 | 24 | 247788 | 0 | 3012 | 2052 | 0 | 108 |

Fig. 11

Analysis By Unit Price (Excerpt)

| Service Code | Bank | | Customer | Activity | Unit Price | Amount | Analysis |
|---|---|---|---|---|---|---|---|
| 00211 | CHK ENCODING CHARGE | | | | | | |
| 106 | UNITED NATIONS BANK | ATLANTA GA | 057 | 2 | 0.015 | | 10/31/1999 |
| | | | Detail records: 1 | Avg: | 0.015 | | |
| | | | | Weighted Avg: | | | |
| 00249 | CHKS UNENC MIXED | | | | | | |
| 854 | NEBRASKA TRUST | HODGENVILL KY | 057 | 2921 | 0.024 | 70.10 | 10/31/1999 |
| 182 | BANK WITH U.S. | CINCINNATI OH | 057 | 6287 | 0.06 | 377.22 | 10/31/1999 |
| 855 | TRISTAR BANK | CLEVELAND OH | 057 | 857 | 0.06 | 51.42 | 10/31/1999 |
| 242 | THE BANK OF | CLEVELAND OH | 057 | 1434 | 0.07 | 100.38 | 10/31/1999 |
| 856 | SKY TRUST | AKRON OH | 057 | 5 | 0.10 | 0.50 | 10/31/1999 |
| 858 | KEY UNION BANK | CLEVELAND OH | 057 | 299 | 0.11 | 32.89 | 10/31/1999 |
| 013 | EASTERN SAVINGS CO. | CLEVELAND OH | 057 | 169 | 0.12 | 20.28 | 10/31/1999 |
| 024 | WESTERN SAVINGS CO. | CLEVELAND OH | 057 | 4651 | 0.125 | 581.38 | 10/31/1999 |
| 211 | COMMERCIAL BANK | DETROIT MI | 057 | 24 | 0.125 | 3.00 | 10/31/1999 |
| 850 | BANK OF ENGLAND | LONDON KY | 057 | 28 | 0.50 | 14.00 | 10/31/1999 |
| | | | Detail records: 10 | Avg: | 0.1294 | 1,251.17 | |
| | | | | Weighted Avg: | 0.075 | | |
| 00250 | CHKS UNENC IN DIST | | | | | | |
| 850 | BANK OF ENGLAND | LONDON KY | 057 | 1 | 0.0605 | 0.06 | 10/31/1999 |
| 851 | NATIONAL BANK | LOUISVILLE KY | 057 | 79 | 0.07 | 5.53 | 10/31/1999 |
| 852 | SOUTHERN BANK | LEXINGTON KY | 057 | 14 | 0.08 | 1.12 | 10/31/1999 |
| 493 | NCP BANK | LOUISVILLE KY | 057 | 49 | 0.0885 | 4.34 | 10/31/1999 |
| 242 | THE BANK OF | CLEVELAND OH | 057 | 835 | 0.09 | 75.15 | 10/31/1999 |
| 741 | NORTHERN TRUST | KNOXVILLE TN | 057 | 62 | 0.09 | 5.58 | 10/31/1999 |
| 251 | MIDWESTERN BANK ON | YOUNGSTO OH | 057 | 11 | 0.10 | 1.10 | 10/31/1999 |
| 484 | APPLE BANK | ERIE PA | 057 | 65 | 0.10 | 6.50 | 10/31/1999 |
| 050 | THE BANK OF | NASHVILLE TN | 057 | 237 | 0.10 | 23.70 | 10/31/1999 |
| 741 | NORTHERN TRUST | KNOXVILLE TN | 057 | 14 | 0.12 | 1.68 | 10/31/1999 |
| | | | Detail records: 10 | Avg: | 0.0899 | 124.76 | |
| | | | | Weighted Avg: | 0.0913 | | |
| 00251 | CHKS UNENC LOCAL | | | | | | |
| 849 | NORTHERN TRUST | CAMPBELLS KY | 057 | 101 | 0.06 | 6.06 | 10/31/1999 |
| 493 | NCP BANK | LOUISVILLE KY | 057 | 173 | 0.0775 | 13.41 | 10/31/1999 |
| 567 | SOUTHERN UNION | MEMPHIS TN | 057 | 7 | 0.08 | 0.56 | 10/31/1999 |
| 242 | THE BANK OF | CLEVELAND OH | 057 | 22 | 0.085 | 1.87 | 10/31/1999 |
| 050 | THE BANK OF | NASHVILLE TN | 057 | 2 | 0.09 | 0.18 | 10/31/1999 |
| 024 | WESTERN SAVINGS CO. | CLEVELAND OH | 057 | 74 | 0.125 | 9.25 | 10/31/1999 |
| | | | Detail records: 6 | Avg: | 0.0863 | 31.33 | |
| | | | | Weighted Avg: | 0.0827 | | |

*This example shows every bank that this client incurred a 'CHKS UNENC MIXED' charge.*

Fig. 12

Working Sheet Report for One Bank

SUPER-CON STORES
Rev Date: 10/31/1999

EASTERN SAVINGS
CLEVELAND, OH
Bank Code: 013

Analysis 2233

| # | Description | October Volume | Costs Unit | Monthly | Service Code | Recommended Unit | Monthly | Savings | Comments |
|---|---|---|---|---|---|---|---|---|---|
| 1 | MAINTENANCE FEE | 1 | 20.00 | 20.00 | 00620 | 20.00 | 20.00 | | |
| 2 | DEPOSITED PROCESSED | 176 | 0.40 | 70.40 | 00425 | 0.40 | 70.40 | | |
| 3 | ACCOUNT ANALYSIS-MANUAL | 1 | 5.00 | 5.00 | 00670 | 5.00 | 5.00 | | |
| 4 | DEPOSIT ADJUSTMENT PROC | 1 | 3.00 | 3.00 | 00426 | 3.00 | 3.00 | | |
| 5 | ENCODED CHECKS DEPOSITED | 15 | 0.05 | 0.75 | 01003 | 0.05 | 0.75 | | |
| 6 | DEPOSITED ITEMS | 169 | 0.12 | 20.28 | 00249 | 0.12 | 20.28 | | |
| 7 | CLEARING SURCHARGE-FEE | 19 | 0.145 | 2.76 | 01000 | 0.145 | 2.76 | | |
| 8 | RET ITEM PROC-REGULAR | 2 | 8.00 | 16.00 | 00265 | 4.00 | 8.00 | 8.00 | |
| 9 | RET ITEM PROC-RECLEAR ITEM | 5 | 4.50 | 22.50 | 00270 | 4.50 | 22.50 | | |
| 10 | BRANCH DEP COIN & CURR-BUNDLED | 481456 | 0.70 | 337.02 | 00340 | 0.70 | 337.02 | | |
| 11 | DEP RECON MAINT | 1 | 50.00 | 50.00 | 00974 | 50.00 | 50.00 | | |
| 12 | DEP RECON PROC | 180 | 0.065 | 11.70 | 00973 | 0.065 | 11.70 | | |
| 13 | DEP RECON RPTS-MAN-EXTRA COPY | 1 | 5.00 | 5.00 | 01001 | 5.00 | 5.00 | | |
| 14 | ACH RECEIVED-DEBIT | 24 | 0.22 | 5.28 | 00630 | 0.22 | 5.28 | | |
| | | | | 569.68 | | | 561.68 | 8.00 | |
| | Annual Projections: | | | 6836.21 | | | 6740.21 | 96.00 | |

*Actual unit cost currently paid by client*

*Recommended unit cost*

*Potential Savings*

Fig. 13

Projected Savings

SUPER-CON STORES
10/31/1999

| | Bank | Bank Name | | | Annual Service | Projected Savings |
|---|---|---|---|---|---|---|
| 1 | 242 | THE BANK OF CLEVELAND | CLEVELAND | OH | 206,033.76 | 6,358.74 |
| 2 | 024 | WESTERN SAVINGS CO. | CLEVELAND | OH | 180,422.05 | 51,651.67 |
| 3 | 858 | KEY UNION BANK | CLEVELAND | OH | 102,676.32 | -38,289.92 |
| 4 | 182 | BANK WITH U.S. | CINCINNATI | OH | 88,168.23 | 12,284.51 |
| 5 | 493 | NCP BANK | LOUISVILLE | KY | 55,515.79 | 16,181.17 |
| 6 | 855 | TRISTAR BANK | CLEVELAND | OH | 14,617.68 | 0.00 |
| 7 | 050 | THE BANK OF NASHVILLE | NASHVILLE | TN | 7,957.86 | 1,751.40 |
| 8 | 013 | EASTERN SAVINGS CO. | CLEVELAND | OH | 6,836.21 | 96.00 |
| 9 | 211 | COMMERCIAL BANK | DETROIT | MI | 5,401.26 | 581.48 |
| 10 | 741 | NORTHERN TRUST BANK | KNOXVILLE | TN | 3,916.32 | 0.00 |
| 11 | 251 | MIDWESTERN BANK ONE | YOUNGSTOWN | OH | 3,070.70 | 1,440.00 |
| 12 | 106 | UNITED NATIONS BANK | ATLANTA | GA | 2,551.20 | 754.20 |
| 13 | 854 | NEBRASKA TRUST | HODGENVILLE | KY | 2,209.61 | 0.00 |
| 14 | 484 | APPLE BANK | ERIE | PA | 1,509.25 | 0.00 |
| 15 | 857 | KEY TRUST | EAST LIVERPOOL | OH | 1,418.40 | 0.00 |
| 16 | 853 | MIDWESTERN TRUST CO | MIDDLESBORO | KY | 1,293.36 | 0.00 |
| 17 | 567 | SOUTHERN UNION BANK | MEMPHIS | TN | 857.16 | 0.00 |
| 18 | 849 | NORTHERN TRUST BANK KY | CAMPBELLSVILLE | KY | 594.00 | 0.00 |
| 19 | 856 | SKY TRUST | AKRON | OH | 512.88 | 0.00 |
| 20 | 850 | BANK OF ENGLAND | LONDON | KY | 321.40 | 0.00 |
| 21 | 852 | SOUTHERN BANK | LEXINGTON | KY | 233.28 | 0.00 |
| 22 | 851 | NATIONAL BANK | LOUISVILLE | KY | 193.32 | 0.00 |
| | | Annual Totals: | | | 686,310.05 | 52,809.25 |

*Potential savings at each bank.*

7.69% — *Annual projection*

$686,310.05

Number based on average net profit percentage issued by client's financial statements.

The Bottom Line

You must generate $13,726,200.99 in sales to cover your annual service charges of:
To add    $52,809.25   to your bottom line would require $1,056,185.01 in sales.

Fig. 14

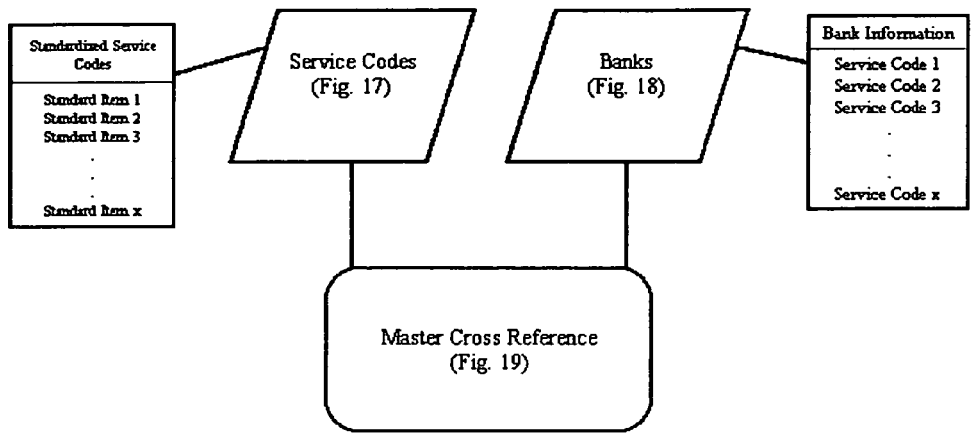

Fig. 15

Service Codes

| Field | FieldType | Length |
|---|---|---|
| FEDServiceCode | Numeric | 6 |
| FEDServiceDescription | Text | 50 |
| FEDCategoryCode | Numeric | 6 |

The Category code indicates which category this service charge falls into.

Fig. 17

Banks

| Field | FieldType | Length |
|---|---|---|
| BankCode | Numeric | 6 |
| BankName | Text | 50 |
| | | |

Fig. 18

BankServ

| Field | FieldType | Length |
|---|---|---|
| BankCode | Numeric | 6 |
| FEDServiceCode | Numeric | 6 |
| BankDescription | Text | 50 |
| | | |

← Cross Reference Table

Relationship: Banks (1) → BankServ (many)

Fig. 19

Clients

| Name | Type | Size |
|---|---|---|
| CustomerNo | Text | 5 |
| CustomerName | Text | 50 |
| Address1 | Text | 35 |
| Address2 | Text | 35 |
| City | Text | 20 |
| State | Text | 2 |
| Zip | Text | 10 |
| Phone | Text | 10 |
| DateEntered | Date/Time | 8 |
| PerCentReturn | Double | 8 |
| Comments | Text | 50 |
| PDL1 | Double | 8 |
| PDL2 | Double | 8 |
| PDL3 | Double | 8 |
| PDL4 | Double | 8 |
| CompanyLogo | Hyperlink | - |

Fig. 21

| Bank Service Charge History | | |
|---|---|---|
| Field | FieldType | Length |
| BankCode | Numeric | 6 |
| FEDServiceCode | Numeric | 6 |
| BankDescription | Text | 50 |
| BankCharge | Numeric | 8 |
| ChargeDate | Date/Time | |
| | | |

AnalysisHdr

| Name | Type | Size |
|---|---|---|
| CustomerNo | Text | 5 |
| BankCode | Text | 10 |
| RevDate | Date/Time | 8 |
| AvgBal | Double | 8 |
| AvgFloat | Double | 8 |
| FedPct | Double | 8 |
| ECRate | Double | 8 |
| AvgDlyNeg | Double | 8 |
| AnalysisNo | Long Integer | 4 |
| NumberOfStores | Long Integer | 4 |
| NegCollectedRate | Double | 8 |
| DateEntered | Date/Time | 8 |

Fig. 24

AnalysisDtl

| Name | Type | Size |
|---|---|---|
| CustomerNo | Text | 5 |
| BankCode | Text | 10 |
| RevDate | Date/Time | 8 |
| ServiceCode | Text | 6 |
| Activity | Double | 8 |
| UnitPrice | Double | 8 |
| SeqNo | Long Integer | 4 |
| RecCharge | Double | 8 |
| Comments | Text | 30 |
| ConCharge | Double | 8 |
| RecDate | Date/Time | 8 |
| ConDate | Date/Time | 8 |

Fig. 25

*Category*

| Field | FieldType | Length |
|---|---|---|
| FEDCategoryCode | Numeric | 6 |
| FEDCategoryDescription | Text | 50 |
| | | |

Category → ServiceCodes is a one-to-many relationship.
The Category code indicates which category this service charge falls into.

Excerpt from FED Categories table.

| CategoryCode | Description | Color |
|---|---|---|
| 47 | 47 BAL REPORTING COSTS | |
| 58 | 58 - OTHER RETURNS | Blue |
| 59 | 59 RETURN CHECK COSTS | Green |
| 60 | 60 - NIGHT BAGS | |
| 61 | Cash Order Cost | |
| 62 | Rolled Coin | |
| 63 | Boxed Coin | |
| 64 | Return Checks | |

Select the proper category from the CATEGORIES table.

Fig. 31

Excerpt from ServiceCategories table:

| ServiceCode | CategoryCode |
|---|---|
| 00279 | 59 |
| 00281 | 59 |
| 00282 | 59 |
| 00283 | 59 |
| 00284 | 59 |
| 02500 | 59 |
| 02501 | 59 |
| 02502 | 59 |
| 00432 | 60 |
| 00439 | 60 |
| 00441 | 60 |
| 00545 | 60 |
| 00550 | 60 |
| 00555 | 60 |
| 00556 | 60 |
| 03001 | 60 |
| 03002 | 60 |
| 00405 | 61 |
| 00305 | 62 |
| 00306 | 62 |
| 00295 | 63 |
| 00265 | 64 |

Select all service codes which fall into this category. In this example, Night Bags.

Fig. 32

| ServiceC | ServiceDescription | Activity | UnitPrice | Monthly Cost | RecCharge | MonthSaving | Commer |
|---|---|---|---|---|---|---|---|
| 00620 | ACCOUNT MAINTENANCE | 1 | 20.00 | 20.00 | 20.00 | 0.00 | |
| 00425 | DEP TICKETS | 176 | 0.40 | 70.40 | 0.40 | 0.00 | |
| 00670 | ANALYSIS REPORT | 1 | 5.00 | 5.00 | 5.00 | 0.00 | |
| 00426 | DEP CORRECTION | 1 | 3.00 | 3.00 | 3.00 | 0.00 | |
| 01003 | MISCELLANEOUS 4 | 15 | 0.05 | 0.75 | 0.05 | 0.00 | |
| 00249 | CHKS UNENC MIXED | 169 | 0.12 | 20.28 | 0.12 | 0.00 | |
| 01000 | MISCELLANEOUS 1 | 19 | 0.145 | 2.76 | 0.145 | 0.00 | |
| 00265 | RETURN ITEM | 2 | 8.00 | 16.00 | 4.00 | 8.00 | |
| 00270 | RETURN ITEM REDEPOSITED | 5 | 4.50 | 22.50 | 4.50 | 0.00 | |
| 00340 | CURR DEP STANDARD | 481456 | 0.70 | 337.02 | 0.70 | 0.00 | |
| 00974 | BAI MAINTENANCE | 1 | 50.00 | 50.00 | 50.00 | 0.00 | |
| 00973 | BAI DETAIL | 180 | 0.065 | 11.70 | 0.065 | 0.00 | |

*Operator of Bank Analyzer recommended charges here, from which monthly savings are derived.*

Fig. 33

AUTOMATED SYSTEM FOR ANALYZING CHARGES AND CREDITS OF BANKS AND OTHER FINANCIAL INSTITUTIONS

COPYRIGHT NOTICE AND AUTHORIZATION

Portions of the documentation in this patent document contain material that is subject to copyright protection. The copyright owner has no objection to the facsimile reproduction by anyone of the patent document or the patent disclosure as it appears in the Patent and Trademark Office file or records, but otherwise reserves all copyright rights whatsoever.

BACKGROUND OF THE INVENTION

Over the last few decades, banks and other financial institutions, hereafter collectively referred to as "banks," have begun charging their clients for the services performed. These charges include, but are not limited to: deposit ticket charges, night bag deposits, electronic transmittal of information, returned check charges and postage. Banks no longer rely to the same extent as they have in the past on the income generated from loans. Bank officers have even attended seminars strictly targeted to increasing revenue through service charges. Even if the evolution of service charge revenue was unintentional, it has become a lucrative opportunity for many banks.

Clients often receive cryptic monthly statements as to what charges they are actually paying for. Consider a scenario wherein supermarket aisles did not indicate the price of the food on the shelves. In addition, suppose the receipt did not include a detail of the food that was purchased or the price of each item. Instead, only a total due during that shopping trip was provided. Or, if the detail was included, it was not listed in readily understood terms, but only in the UPC Barcodes of the product. It would not be easy to comparison shop, or to determine better ways to shop, such as buying larger sizes of items you may use frequently. This scenario is analogous to the way service charges are presently handled between banks and their clients. Furthermore, the bank often deducts service charges from the earnings credit (Interest) posted to the clients' accounts. To continue the supermarket analogy, imagine if the receipt didn't tell you how much you actually spent that day, just a running total against some prepaid balance you may have on account with the supermarket. Banks may not have intentionally created these problems. However, these problems prevent clients from understanding and managing their charges effectively.

These analogies illustrate how many large businesses (clients) currently interact with their banks. Coupled with the fact that charges imposed are not listed in layman's terms on the bank analysis, it has become extremely difficult for a client to control these charges. This weakens the client's financial and bargaining position and gives little leverage when negotiating with the client's bank. It also inhibits the client from attaining the highest possible earnings credit.

Many clients have numerous locations (stores) throughout the country who use the same bank. The statements issued by the bank offer little help in determining charges per store, and do not provide the client's financial managers with the essential data required to make appropriate fiscal decisions.

An additional problem for clients is that each bank uses its own set of terms to define its service charges and credits, thereby making it difficult or impossible for a client to comparison shop among banks for the best deal on service charges and credits.

Accordingly, there is an unmet need for analysis tools to allow a client to more fully understand bank service charges and credits. The present invention fulfills such a need.

SUMMARY OF THE INVENTION

A first embodiment of the present invention provides a computer-implemented scheme for preparing bank service charge reports for banking activity of a client. In the scheme, an electronic translator is provided that converts service charge items of a plurality of individual banks, expressed in terminology of the respective individual banks, to a service description expressed in a standardized terminology. At least some of the service charge items of different banks have the same standardized service description. Bank service charge items and bank account data are inputted into a computer. The bank service charge items and bank account data are for a specified period of time for one or more banks being used by a client. The bank service charge items and bank account data are obtained from one or more bank statements of a client and are expressed in the one or more statements in terminology used by the one or more banks. In the computer, one or more bank service charge reports are automatically created for the client from the inputted bank service charge items by using the electronic translator. Each bank service charge report provides a breakdown of bank service charges based upon the standardized service descriptions.

A subset of the standardized service descriptions of bank service charges may define a total amount of a predefined type of bank service charge costs. In this scheme, the total amount of a predefined type of bank service charge costs is calculated by adding together the bank service charges in the subset. A total cost report is then created for the predefined type of bank service charge costs from the calculated total. The subset may define total depository costs, total check costs, total account maintenance costs, or any total of a service charge category.

A historical database may be provided of average bank service charges for selected standardized service descriptions based upon bank service charges of a plurality of clients. The individually broken down bank service charges may then be compared to the average bank service charges. The comparison may be used by the client to identify potentially excessive bank service charges. Alternatively, a database of bank service charges may be provided for each of the standardized service descriptions based upon bank service charges of all of the banks used by the client. The individually broken down bank service charges for one of the client's banks may then be compared to the bank service charges for other banks used by the client. Again, the comparison may be used by the client to identify potentially excessive bank service charges.

One of the standardized service charge items may be deposit ticket costs, wherein deposits have a predefined earnings credit rate. The deposit ticket costs and the earnings credit rate may be used to calculate a breakeven deposit amount wherein the earnings credit exceeds the cost of depositing money.

In a second embodiment of the present invention, a similar process as described above is performed for earnings credit items.

BRIEF DESCRIPTION OF THE DRAWINGS

The file of this patent contains at least one drawing executed in color. Copies of this patent with color drawings will be provided by the Patent and Trademark Office upon request and payment of the necessary fee.

FIG. 1 (provided in parts 1 and 2) summarizes reports generated by the present invention, and the information provided by the reports that is not currently available to a banking customer;

FIGS. 2–14 show examples of the reports summarized in FIG. 1;

FIG. 15 is a schematic block diagram of a cross-reference table in accordance with the present invention;

FIGS. 17–19 show the contents of tables used in the cross-reference table;

FIG. 21 shows a table that stores client data;

FIGS. 24 and 25 shows the contents of tables used in a dynamic compilation process;

FIGS. 31 and 32 show excerpts from charts that are used to determine costs of a particular service charge category; and FIG. 33 is a screen display of a Working Sheet Form that is used to summarize service description items, and their actual costs and potential cost savings.

DETAILED DESCRIPTION OF THE INVENTION

Figure 16:
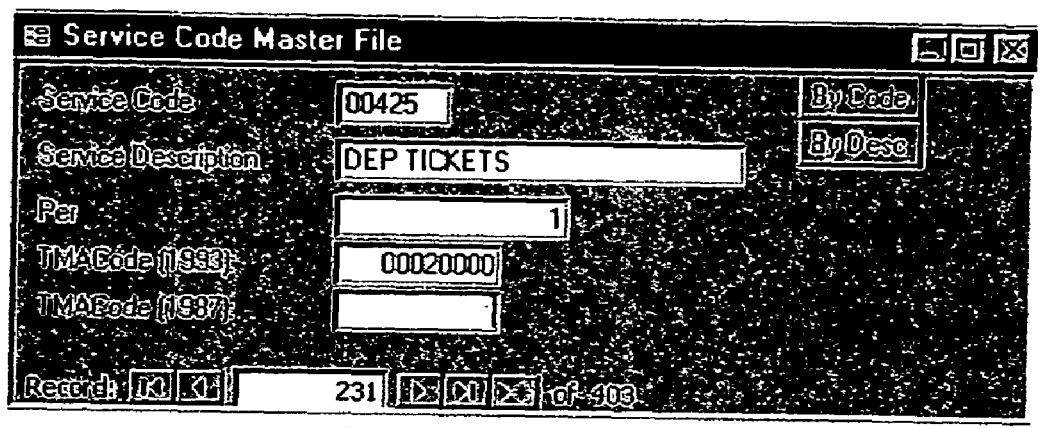
FIG. 16 shows an entry screen of a form used to collect and store service charges.

Certain terminology is used herein for convenience only and is not to be taken as a limitation on the present invention. In the drawings, the same reference letters are employed for designating the same elements throughout the several figures.

Definitions

Comp Balance—balances on hand at bank, subject to the bank's earnings credit.

Earnings Credit—interest earned on available client's assets, taken after the Federal Reserve requirement is deducted.

Federal Reserve Requirement—amount by law which must be reserved by the bank for the Federal Reserve (non-earning asset), usually 10% of client's balance.

Treasury Bill—(T-Bill)—interest rate set by the US Government.

Fed Funds Rate—A target interest rate for banks borrowing reserves among themselves. It is set by the Federal Open Markets Committee. See web site: http://www.bankrate.com/brm/green/define/#fomc for more information.

Float—checks which have been deposited but funds are not yet available.

Revision Date—date of the bank statement (usually issued on monthly basis).

Basis Point—one one-hundreth of a percent, e.g., 300 basis points is 3%.

Overview of Present Invention

The present invention is implemented as a software program called "The Bank Analyzer," that aims to empower clients with the necessary information to ensure fair treatment from their bank. The software generates numerous reports which explain in layman's terms exactly how bank service charges are broken down. Furthermore, the reports are presented in color, making it easy for even a novice to elicit the needed information. Armed with such information, a client will understand exactly where and how service charges can be reduced and/or earnings credits can be increased.

Prior to the present invention, some clients may have suspected that certain bank charges were askew, certain transactions were wasteful, and certain transactions were unnecessary. However, there was never any solid clear-cut method of substantiating these suspicions. Furthermore, it was the belief of clients that the resources necessary to even begin an investigation would outweigh any results. The present invention includes a plurality of analysis techniques that were previously not available and which are implemented in formulas that generate Illumination Reports (described below). The Illumination Reports yielded by the present invention provide a catharsis to the clients in managing their bank charges.

The basic philosophy of the invention is (1) Effective Management of Bank Service Charges; (2) Illumination of Data; and (3) Edification of the Client.

In the examples provided in the figures and tables below, Bank Names and Client names are fictitious, but the values and dollar amounts represent actual data.

Illumination Reports Table (Diagnostic Section)

FIG. 1 (provided in parts 1 and 2) summarizes in table form each report from the diagnostic section of the present invention, highlighting the areas of most impact. In many cases, clients are unaware that the data produced by the present invention may be significant to the financial well being of their company. In other cases, there is no simple method of obtaining this data. Lack of data precludes effective management of such charges.

The disclosure below covers various methods and systems to assist clients in managing their bank service charges and reducing or eliminating cost incurring transactions. The focus also centers on elevating client awareness and providing a clear-cut analysis of how bank charges are affecting their bottom line. Also, the disclosure presents the algorithms of the software which provide this assistance. Exemplary methods include:

1. Revealing actual Bank Service Charges assessed.
2. Minimizing strap charges, i.e., the charges a bank assesses for counting clients money, by strapping in denominations which yield the best results.
3. Comparison of clients' bank charges, i.e., Deposit Tickets, Night Bag Deposits, etc. . . . with charges of other clients' banks nationwide. Recommendations are made based on these national averages.
4. Evaluation of clients' non-earning assets and recommendations on how to maximize revenue from these assets.

Exemplary algorithms include:
1. Using dynamic report generation forms to allow the user to extract the necessary information to execute the methods.
2. Creating cross-reference tables between a bank charge and its description according to the particular bank, and the actual charge expressed in layman's terms.
3. Storing all bank analysis data in a minimum number of tables, and calculating and deriving comparison information "on the fly," that is, each time a report is generated. This ensures up-to-the-minute accurate information.

DETAILED DISCLOSURE

This section outlines what each report accomplishes. Refer to the attached figures for examples that correspond to the figure numbers listed. The alphanumeric characters refer to data highlighted in the respective figure. For example, "2a" highlights data in FIG. 2.

Bank Balance Data (FIG. 2)—Here the Bank Analyzer exposes the total service charge assessed a client for the particular revision date. (2a) Note that the Bank Analyzer reveals the actual charge, not the 'net' one which the client now sees. The net charge includes a 'comp' balance, which are client's balances subject to the Banks' earnings credit. In some cases, the earnings credit offsets any service charges. That is, the client believes that no service charges are being paid, when, in fact, the service charge is deducted from any earnings credit due. FIG. 2 shows how this client (SUPER-CON Convenient Stores) has paid $57,192.50 in the month of October, 1999 to their banks. The report details not only totals but amounts to each bank, e.g., $15,035.17 paid to the Western Savings Co. (see line #2 of the example report).

Earnings Credit Analysis (FIG. 3)

This report color codes basis point shaved, to indicate abnormal bank activity.

This report is a scorecard to see how a client's bank performs against the T-bill rate. (3a) It indicates the difference between T-Bill and client's actual earnings. The results are instantly revealed. This process would consume hundreds of man-hours to produce otherwise. Armed with this report, a client can be sure to be credited with at least the T-Bill Rate.

Fed Funds (3b)—This same report also shows the amount of money the bank is earning by investing the client's money at the Fed Funds rate. The bank will often invest in Fed Funds when they are not using it to generate loan revenue. This gives the client a look at how much money the bank can earn from the client's money.

Income Difference (3c)—Finally, the income difference is determined, which is the difference a client can add to its bottom line if given the corresponding interest rates. This generally results in a tremendous increase to the client's bottom line. (3d).

The Bank Names, as well as the basis points shaved, are printed in degrees of color. This facilitates isolating the cases where the client can realize the maximum benefit. (3e).

Earnings Credit And Negative Collected Rates (FIG. 4)

As a supplement to the Earnings credit Report, this report matches the Earnings Credit on positive balances to the rate imposed on Negative Collected funds. Clients should be charged the prime interest rate. However, typical findings indicate that clients are sometimes charged as much as 300 basis points over prime. A fair bank would actually pay at a 1:1 ratio by posting earnings at the same rate imposed on the negative collected balance. The example report shows one sample bank (4a) which is charging significantly higher negative collected rates than earnings credit rates, and one sample bank (4b) which is charging fair rates.

Checks, Deposits And Float Data (FIG. 5)

Avg Check Size Per Store (5a)

Occasionally, the bank will assess a float table that does not correspond to actual availability. This report will alert client to this fact, by showing them the Avg Check Size per store. The client usually has a good idea of the average check a store receives, (e.g., a drug store may receive checks that average about $75, whereas a lumberyard may have checks averaging $300). If this check size becomes inflated, that is, if the client sees that the value is more than it normally would be, then the client knows to investigate and to look at each check. In many cases, the client may realize that the bank is not posting the checks to his/her account promptly. Without the use of the present invention, discovery of this fact would consume inordinate amounts of time and resources.

Out Of District (5b)

The Out Of District column indicates checks received from customers of the client that are drawn on banks outside the local district of the depository bank. It is common that most customers bank locally. Therefore, 90% should be in district. The column indicating 2 Day % is the derived Out Of District number. If this number is not within this normal average, it is an alert that the bank may not be providing the proper calculation with the float. Also, it is likely that the service charge is increased, because Out Of District service charges are generally more expensive.

Checks On Us (5c)

This column determines the presence that a bank has in a region, and On Us Checks should be treated as cash and should be made available immediately. Clients can now ensure that this is the case.

Breakdown By Service Charge Groups (FIG. 6)

The Bank Balance Data report illuminated the actual Total Service Charges assessed. This report begins putting the Total Service Charge number under the microscope, commonly referred to as drill-down reporting in the computer field. This report shows the 3 main categories:

Categories Depository Costs (dep tickets, cash bags, etc . . . ) (6a)

Check Costs (Checks dep, ret items, etc...) (6b)

Account Maintenance (balance reporting) (6c)

The percentage of the total cost is analyzed, and if these three categories do not total close to 100%, then there is a good chance that a particular charge is askew. Potential items to investigate include:

1. Negative interest charge for using uncollected funds (See Earnings Credit and Negative Collected Rates report).

2. Bounced check fees—too high?

These percentages can be compared with other clients' percentages to assist in evaluation. Volumes (amount of activity) are also considered, to ensure fair comparisons.

Breakdown By User Selected Groups (FIG. 7)

This report allows for the creation of custom reports tailored to each client. Multiple service charges can be lumped into groups, and then these groups can be evaluated. For example, a client may want to see a breakdown of lock box deposit charges. Presently, this would require mining every statement for any charge pertaining to a lock box. It is not always clearly indicated on the bank statement, so research could also be required. Using a conventional analysis process, it could require numerous hours or more for a client to presently determine all of the lock box charges. In the present invention, service charges can be grouped into a category, for example, Lock Box Charges. Then, the cross-reference table links all lock box charges: Correspondence, Courier, Delivery US Mail, Checks Deposited, etc. . . . The report then displays at a glance the actual Lock Box charges that a client is paying for.

Lock Box Charges is just an example category. Any group can be analyzed, e.g., Depository Costs, Checks, Cash, Coin, etc. . . . This information is invaluable to the client and has never before been available to the client. Any categories can be supplied, yielding hundreds of possibilities for analysis depending on the client's particular situation.

Unit Price Summary (FIG. 8)

This report shows every service charge assessed for the client encompassing all stores, all banks, and every line item. The report shows at a glance monthly totals, yearly totals (calculated) and also average and weighted average, which considers volume. This information was so difficult to obtain using conventional analysis processes that clients never even considered attempting to acquire it.

Deposit Ticket Costs (FIG. 9, provided in parts 1 and 2)

This report examines the prudence of daily deposits by examining every cost associated with making a deposit. Since clients make frequent deposits of large sums of checks and cash, these charges can be substantial. See 9a for a sample of the total cost incurred in one year for one client. Prior to the present invention, these charges could never be investigated or verified, and therefore it was not possible to show inefficiencies in the client's business practices. This report also determines the daily deposit a client must make in order to "break even." It is actually possible for a client to lose money by making too many deposits, because the cost of depositing the money outweighs any earnings credit that may be earned. (9b).

Finally, the Potential Daily Loss columns show the exact amount lost (9d) if the deposit were equal to the column headings. (9c) It should be noted that these values depend upon the average return rate a client expects to make. (9e) This value is dynamic, and can be changed (inputted) each time the report is generated.

Cash Activity Costs (FIG. 10)

Banks charge their clients to count the cash being deposited. Clients are generally charged in one of two ways: by strap or per $1000 counted. If a particular client receives a lot of cash, it behooves a client to be charged by strap since 1000 single dollar bills is charged the same as 10 one hundred dollar bills, even though it is more labor intensive to count 1000 bills than 10 bills. When charged by strap, 100 100 dollar bills are charged the same as 100 1 dollar bills. This decision varies depending on the cash composition of the business client is engaged. For example, a newsstand which receives numerous one dollar bills is generally better off paying by the 1000, because they will have numerous bills. On the other hand, a supermarket may be better off paying by strap, as they may receive greater denominations. In either case, the reports will highlight this information, permitting the client to choose wisely.

Another area often overlooked by clients is the Rolled coin charges (10a). Clients are often charged for the phone call to order the coin! This report allows deeper probing into this matter.

Another benefit of the Cash Activity Costs report is that it allows for verification that the proper amount of cash is being counted. Currently, clients must assume that the banks' report is correct.

To gain insight into just how much it costs to count cash, see the client's monthly charge (10b) and yearly projection. (10c).

Banking Activity (FIG. 11)

This is a summary report, which details vital information such as Deposit Tickets, BAI Detail, Night Bags and Rolled Coin charges. It is used as a support and guide to aid the client in understanding the detail diagnostic reports.

Analysis By Unit Price (FIG. 12)

This report takes the Unit Price Summary and drills down every charge to list each bank where the charge was derived. It is a lengthy report and is used to isolate problem areas when the summary indicates a potential problem area. It serves as a complete audit trail tracking the lowest level of detail from each of the client's banks.

Illumination Reports (Action Items)—(FIGS. 12–14)

This section provides a 'blueprint' to the client for the steps which should be taken.

This section also contains every line item of every analysis from every bank for the client, and the revision date being considered. (see FIG. 12) This serves as supporting information when the client is making the decisions necessary to eliminate or reduce transactions, as well as negotiate with the bank for a reduction in charges which are deemed unfair.

This section contains the following items:

Working Sheet Report (FIG. 13)—contains a trace number which references where the original data came from. Provides client with actual volume and cost amounts, in addition to the recommendations based on the comparison with similar clients at similar banks. It also highlights the potential savings a client can garner from implementing these recommendations. Annual projections are extrapolated.

Projected Savings Report (FIG. 14) shows the clients' potential savings for each of their banks if the recommendations in FIG. 13 are implemented.

How the Bank Analyzer Works

Examples of source code for implementing the Bank analyzer are provided in this section.

There are 4 sections to the Bank Analyzer, as follows:

SECTION I—Static Compilation

SECTION II—Dynamic Compilation—Input of Monthly Bank Analysis Data

SECTION III—Report Generation—Black Box effect

SECTION IV—Illumination—Meeting with Client

This portion of the disclosure provides a detailed description of how the present invention works, and how it generates the reports to edify the clients.

SECTION I—Static Compilation

Static Compilation refers to the acquiring of data and inputting of data which will form the basis of the eventual evaluation prepared for the client. This section has two functions. The first function is to build a master cross-reference table, shown schematically in FIG. 15. The second function is history compilation.

Function #1—Building A Master Cross-Reference Table

This function begins with the massive input of every possible service charge from every bank a client is associated. Each service charge is assigned a unique code and a layman's (layperson's) term. FIG. 16 shows an entry screen of a form used to collect and store service charges. Every possible charge incurred by the clients is entered here, and is assigned a standardized service description.

FIG. 17 shows a layout and structure of the cross-reference table. This table houses every bank service charge encountered from the statements. The ServiceCodes are a unique way of identifying all charges for all clients. This table can add new entries as banks create new service charges, but the information is generally static and therefore this table is generated during the Static Compilation section of the Bank Analyzer software.

Once the service codes are established, it is necessary to maintain a database of bank information and a link between the bank's service charges and the internal codes of the Bank Analyzer. This ensures that clients will see the same terminology when analyzing all of their banks, and will also provide the method of translating back to the bank's language when dealing with a specific bank. These functions are accomplished mainly by the use of two tables, Banks (FIG. 18) and BankServ (FIG. 19). FIGS. 17 and 18 combine to make the cross-reference table. The Banks table houses in a computer database each bank that a client is associated. The BankServ table houses in a computer database each service charge assessed by a bank, and the corresponding code assigned to this service charge by the Bank Analyzer software. The BankDescription field maintains the terminology used by the bank for future reference when dealing with the bank. This foundation data is collected in a computerized form and can be searched and retrieved via screen displays as shown in FIG. 20A and FIG. 20B.

Figure 20:
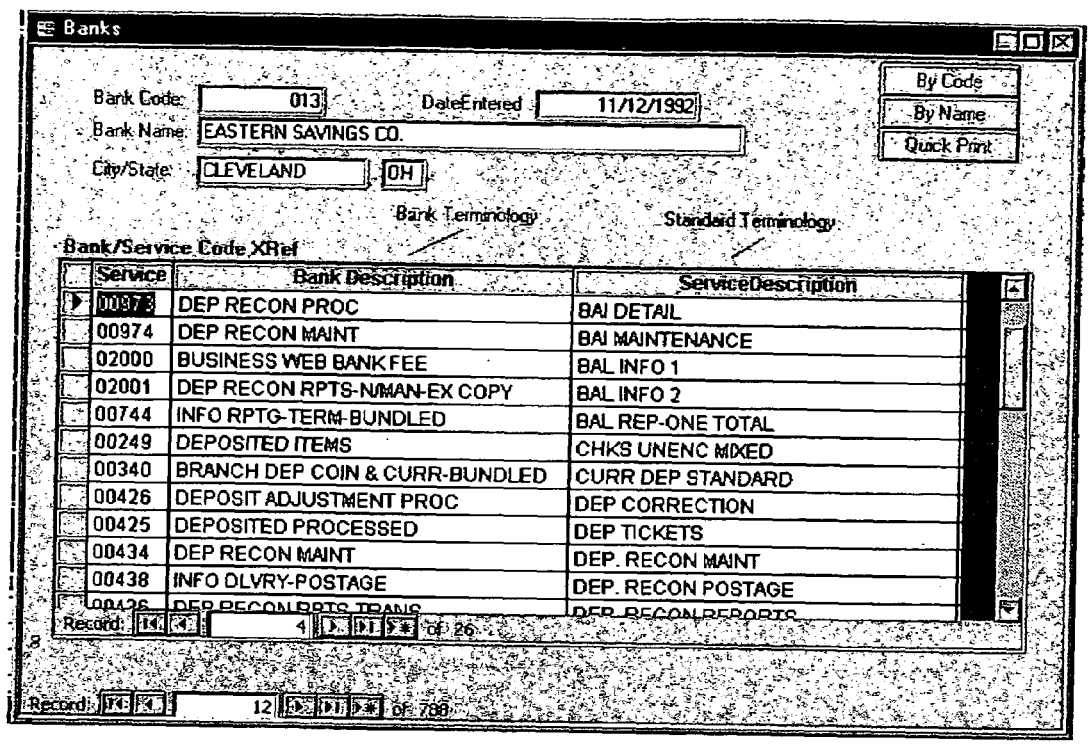
FIG. 20A and FIG. 20B show screen displays for viewing bank description and service description data in the cross-reference table.
Figure 20:
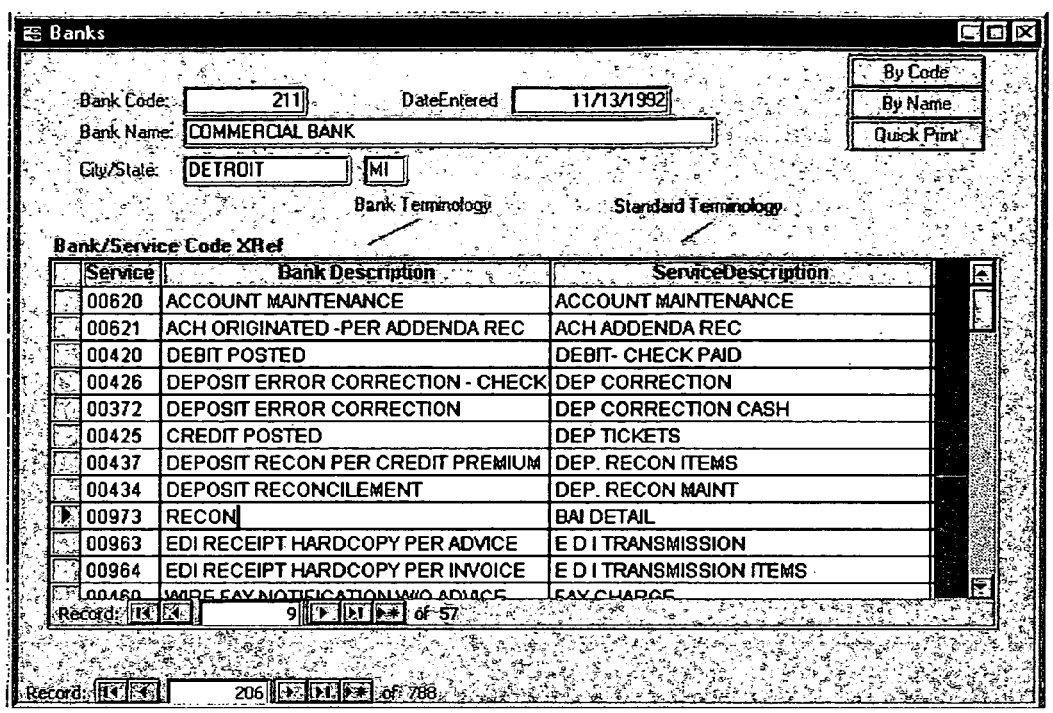

FIG. 20A and FIG. 20B illustrate the use of an electronic translator that converting service charge items of a plurality of individual banks, expressed in terminology of the respective individual banks, to a service description expressed in a standardized terminology. The translation goes in the reverse direction when the results are used in discussions with the clients' banks. At least some of the service charge items of different banks have the same standardized service description. For example, the service charge for "Deposit Tickets" (standardized service code 00425) is referred to as "Deposited Processed" by Eastern Savings Co. (see FIG. 20A), and is referred to as "Credit Posted" by Commercial Bank (see FIG. 20B). In another example, "BAI Detail" (Bank Administration Institute Detail) (standardized service code 00973) is referred to as "Dep Recon Proc" by Eastern Savings Co. (see FIG. 20A), and is referred to as "Recon" by Commercial Bank (see FIG. 20B).

FIG. 21 shows a Clients table that stores client data for the Bank Analyzer software.

Sample Visual Basic for Applications (VBA) code for controlling interface of Banks table:

```
Code
1 VERSION 1.0 CLASS
2 BEGIN
3 MultiUse= -1 True
4 END
5 Attribute VB_Name= "Form_Banks"
6 Attribute VB_GlobalNameSpace= False
7 Attribute VB_Creatable= True
8 Attribute VB_PredeclaredId= True
9 Attribute VB_Exposed= False
10 Option Compare Database
11 Option Explicit
12
13 Private Sub Command16_Click( )
14 D Cmd.OpenReport "Banks By Code", acViewPreview
15 End Sub
16
17 Private Sub Command17_Click( )
18 D Cmd.OpenReport "Banks By Name", acViewPreview
19 End Sub
20
21 Private Sub Command52_Click( )
22 D Cmd.OpenReport "Banks Quick Print", acPreview,, "[BankC de]= " & Me!BankC de &
23 End Sub
24
25 Private Sub Form_Activate( )
26 DoCmd.Restore
27 End Sub
28
29 Private Sub Form_Current( )
30 If Me.NewRecord Then
31 BankCode.SetFocus
32 End If
33 End Sub
34
35 Private Sub Form_Load( )
36 If Not IsNull(Me.OpenArgs) Then
37 Me!BankCode= Me.OpenArgs
38 End If
39 End Sub
```

Sample VBA code for controlling Service Codes interface:

```
Code
1 VERSION 1.0 CLASS
2 BEGIN
3 MultiUse= -1 True
4 END
5 Attribute VB_Name= "Form_ServiceCodes"
6 Attribute VB_GlobalNameSpace= False
7 Attribute VB_Creatable= True
8 Attribute VB_PredeclaredId= True
9 Attribute VB_Exposed= False
10 Option Compare Database
11 Option Explicit
12
13 Private Sub Command16_Click( )
14 DoCmd.OpenReport "ServiceCodes By Code", acViewPreview
15 End Sub
16
17 Private Sub Command17_Click( )
18 DoCmd.OpenReport "ServiceCodes By Description", acViewPreview
19 End Sub
20
21 Private Sub Form_Current( )
22 If Me.NewRecord Then
23 ServiceCode.SetFocus
24 End If
25 End Sub
26
27 Private Sub Form_Load( )
28 If Not IsNull(Me.OpenArgs) Then
29 Me![ServiceCode]= Me.OpenArgs
30 End If
31 End Sub
```

Function #2—History Compilation

Figures 22, 23:
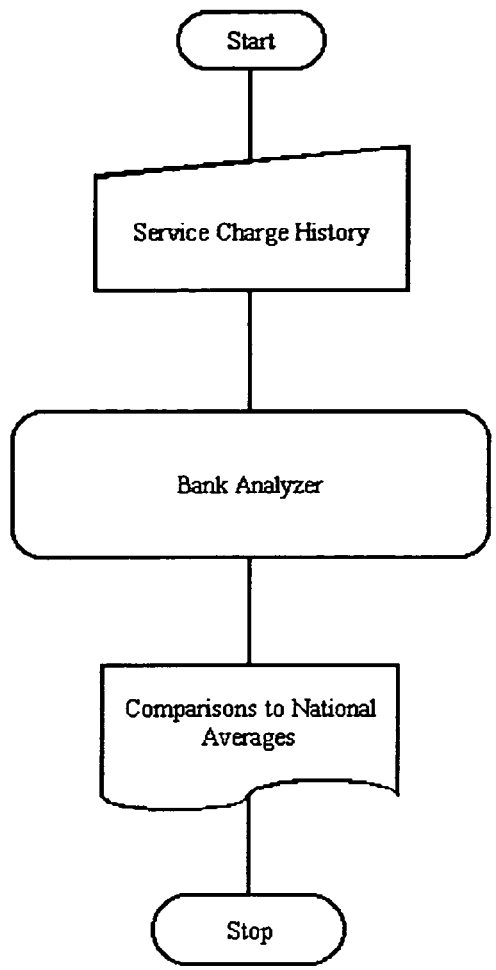
FIG. 22 is a flowchart of a history compilation process of the present invention.
FIG. 23 shows the contents of a Bank Service Charge History table used for the history compilation process.

History compilation entails the process of taking bank statements from previous months and entering them into a computer database in the Bank Analyzer. Data collected by this process is used for making accurate and informative comparisons between clients, and is helpful in determining appropriate and fair service charges. A flowchart of the process is shown in FIG. 22, and field layouts for a Bank Service Charge History table is shown in FIG. 23.

SECTION II—Dynamic Compilation—Input of Monthly Bank Statement Data

The Bank Statement issued by the bank to the client encompasses all stores for that client. The Bank Analyzer program provides a data collection form where this information is housed. This information is the raw material used to generate the final product. The two main tables used in this section are the AnalysisHdr and AnalysisDtl files. See FIG. 24 and FIG. 25 for the field layouts of these tables.

Sample VBA Code for controlling interface for AnalysisHdr:

```
Code
1  VERSION 1.0 CLASS
2  BEGIN
3  MultiUse= -1 'True
4  END
5  Attribute VB_Name= "Form_AnalysisHdr"
6  Attribute VB_GlobalNameSpace= False
7  Attribute VB_Creatable= True
8  Attribute VB_PredeclareId= True
9  Attribute VB_Exposed= False
10 Option Compare Database
11 Option Explicit
12
13 Private Sub BankCode_BeforeUpdate(Cancel As Integer)
14 If Not Me.NewRecord Then
15 If MsgBox("You are about to change the bank code." & vbCr & "This will change all service codes to be under the new bank." & vbCr & "Is this what you want to do?", vbOKCancel, "Key Field Change")=vbCancel Then
16 DoCmd.CancelEvent
17 Me!BankCode.Undo
18 End If
19 End If
20
21 End Sub
22
23 Private Sub BankCode_GotFocus( )
24 BankCode.Dropdown
25 End Sub
26
27 Private Sub BankCode_NotInList(NewData As String, Response As Integer)
28 Dim Result
29 Dim msg As String
30
31 If NewData= " " Then Exit Sub 'cleared combo box
32
33 msg= " "NewData & "is not in the Banks file." & vbCr & vbCr & "Do you want t add it?"
34 Yes
35 If MsgB x(msg, vbQuesti n+vbYesNo)= vbYes Then
36 DoCmd.OpenF rm "Banks",,,, acFormAdd, acDial g, NewData
37 End If
38
39 'I k for new record added
40 Result= DLo kup("[BankCode]", "Banks", "[BankC de]= " & NewData & "'")
41 If IsNull(Result) Then
42 'suppress error message
43 Resp nse= acDataErrContinue
44 MsgBox "Please enter a new customer number."
45 Else
46 'they added it
47 Response= acDataErrAdded
48 End If
49 End Sub
50
51 Private Sub Command45_Click( )
52 DoCmd.OpenForm "BankService Select", acNormal
53
54 End Sub
55
56 Private Sub Command46_Click( )
57 DoCmd.OpenForm "AnalysisRpt Select"
58 End Sub
59
60 Private Sub Command47_Click( )
61 Dim crt As String
62 crt="[AnalysisNo]=" & Me!AnalysisNo
63 DoCmd.OpenForm "WorkingSheetHdr", acNormal,, crt, acFormEdit,, True
64 End Sub
65
66 Private Sub Command49_Click( )
67 DoCmd.OpenReport "Analysis Rpt", acpreview,, "[AnalysisNo]=" & Me!AnalysisNo
68 End Sub
69
70 Private Sub Command50_Click( )
71 ' Print the Bank Balance Data Rpt
72 Dim crt As String
73 crt= "[CustomerNo]='" & Me!CustomerNo & "'"
74 crt= crt & "AND [RevDate]=" & Me!RevDate & "#"
75 DoCmd.OpenReport "Bank Balance Data", acViewPreview,, crt
76 End Sub
77
78 Private Sub Command52_Click( )
79
80 Const twipsperInch= 1440
81 DoCmd.OpenReport "Analysis Rpt", acPreview,, "[AnalysisNo]=" & Me!AnalysisNo
82 DoCmd.MoveSize 0, 0, 8 * twipsperInch, 6 * twipsPerInch
83 End Sub
84
85 Private Sub Command53_Click( )
86 If Command53.Caption= "Sequence #" Then
87 Command53.Caption= "Code"
88 Me!AnalysisDtl.Form.OrderBy= "ServiceCode"
89 Else
90 Command53.Caption= "Sequence #"
91 Me!AnalysisDtl.Form.OrderBy= "SeqNo"
92 End If
93
94 End Sub
95
96 Private Sub Command59_Click( )
97 Dim crt As String
98 crt= "[CustomerNo]='" & Me!CustomerNo & "'"
99 crt=crt & "AND [RevDate]=#" & Me!RevDate & "#"
100 D Cmd.OpenReport "Bank Balance Data By Float", acViewPreview,, crt
101 End Sub
102
103 Private Sub Command60_Click ( )
104 Dim crt As String
105 crt="[Cust merN]='" & Me!CustomerN & "'"
106 crt=crt &" AND [RevDate]=#" & Me!RevDate & "#"
```

107 D Cmd.OpenRep rt "Bank Balance Data By EC Rate", acViewPreview,, crt
108
109 End Sub
110
111 Private Sub Command61_Click( )
112 DoCmd.OpenForm "EC Analysis Select"
113 End Sub
114
115 Private Sub CustomerNo_BeforeUpdate(Cancel As Integer)
116 If Not Me.NewRecord Then
117 If MsgBox("You are about to change Customer number." & vbCr & "This will result in these service codes to be under the new customer." & vbCr & "Is this what you want to do?", vbOKCancel, "Key Field Change")=vbCancel Then
118 DoCmd.CancelEvent
119 Me!CustomerNo.Undo
120 End If
121 End If
122
123 End Sub
124
125 Private Sub CustomerNo_GotFocus( )
126 CustomerNo.Dropdown
127 EndSub
128
129 Private Sub CustomerNo_NotInList(NewData As String, Response As Integer)
130 Dim Result
131 Dim msg As String
132
133 If NewData=" "Then Exit Sub 'cleared combo box
135 msg=" " & NewData & "is not in the Customer file." & vbCr & vbCr & "Do you want to add
136 'Yes
137 If MsgBox(msg, vbQuestion+vbYesNo)=vbYes Then
138 DoCmd.OpenForm "Customer", , , , acFormAdd, acDialog, NewData
139 End If
140
141 'look for new record added
142 Result=DLookup("[CustomerNo]", "Customer", "[CustomerNo]='" & NewData & "'")
143 If IsNull(Result) Then
144 'suppress error message
145 Response=acDataErrContinue
146 MsgBox "Please enter a new customer number."
147 Else
148 'they added it
149 Response=acDataErrAdded
150 End If
151
152
153 End Sub
154
155 Private Sub Form_Activate( )
156 If CurrentUser( )= "Admin" Or CurrentUser= "CarmJr" Then
157 DoCmd.ShowToolbar "Menu Bar", acToolbarYes
158 Else
159 DoCmd.ShowToolbar "Menu Bar", acToolbarNo
160 End If
161 MaximizeRestoredForm Forms!analysisHdr
162 End Sub
163
164 Private Sub Form_Close( )
165 D Cmd.OpenForm "Analysis Select r"
166 End Sub
167
168 Private Sub Form_Current( )
169 If Me.NewRecord Then
170 Cust merN .SetF cus
171 End If
172 End Sub
173 Private Sub NegCollectedRate_Exit(Cancel As Integer)
174 If Me.NewRecord Then
175 AnalysisDtl.SetFocus
176 End If
177 End Sub SECTION III—Report Generation This section describes the black box effect of the invention and discloses the methods and algorithms used to create the desired results. It also lists sample source code of key aspects of the program. Once the data in the previous two sections has been amassed, it is now ready to be processed. This section illustrates the core functionality of the present invention. A majority of the information revealed by the reports was previously unknown to the clients. The following lists Key fields which are utilized throughout the Bank Analyzer software:

AvgDlyPos—the average daily positive balance
FedPct—the current percentage mandated for the Reserve requirement
AdjBal—adjusted balance
AvgBal—average balance
AvgFloat—average float
EcRate—earnings credit rate
ReserveReq—reserve requirement amount
AvailableBalance—available balance
AvgFloatPerStore—average float per store
AnalysisNo—unique indexed number
NegCollectedRate—negative collected rate, compared with the ECRate Report: Bank Balance Data (FIG. 2)

Objective: Determine actual Total service charges paid by clients

The TotalServiceCharges field is derived from the CalcServTotal function, which is fed the information from the analyses entered during the dynamic compilation phase. The source code follows, which describes how to derive the actual service charges paid by bank and with totals (2a), for the client being examined.

Figure 26:
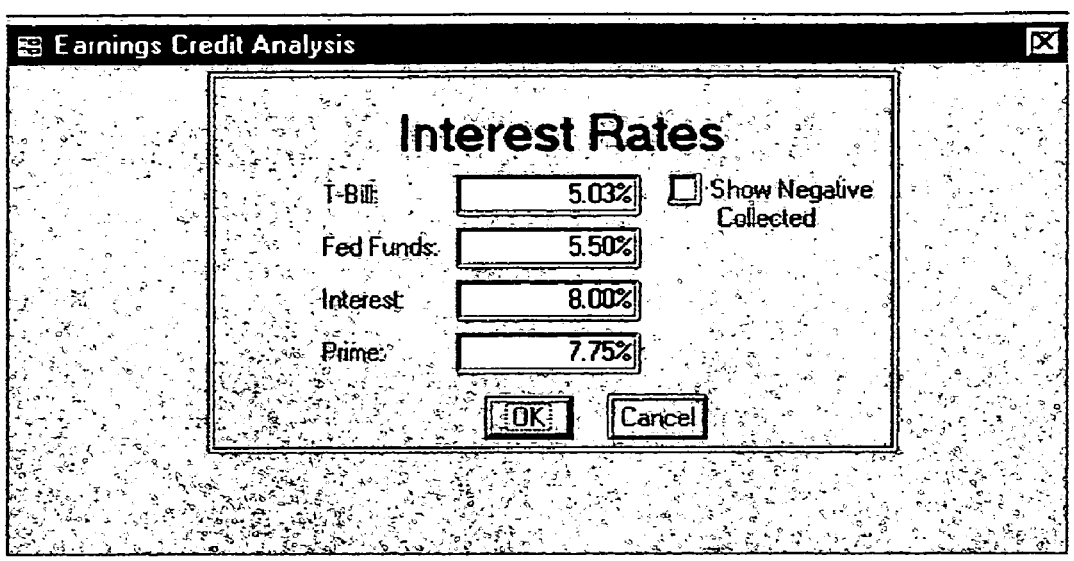
FIGS. 26 and 27 are data entry screens used in the report generation process.

Public Function CalcsevTotal(R As Repprt)
'Determining actual service charges
'This function is called for every line displayed and/or printed in the Bank Balance Data report—FIG. 2 in the disclosure
Dim tmpAmount As Double
Dim msg, crt As String
On Error Resume Next
'select the bank we're examining
crt="[CustomerNo]='" & Forms!analysisHdr.CustomerNo & "'"
crt=crt & "AND [BankCode]='"& R.BankCode & "'"
crt=crt & "AND [RevDate]=#" & Forms!analysisHdr.RevDate & "#"
'obtain fields from the AnalysisDtl table described in Dynamic Compilation section tmpAmount=DSum("[Activity]*[UnitPrice]", "AnalysisDtlQ", crt)
'return the answers in variables ServicesTotal=ServicesTotal+tmpAmount
CalcServTotal=tmpAmount
On Error GoTo 0
End Function
Report: Earnings Credit Analysis (FIG. 3)
Objectives:
1. Basis points shaved
2. Projected Fed Fund amount
3. Projected T-Bill amount
4. Projected Income Difference The report generation process begins with a data entry screen, as shown in FIG. 26. The T-Bill, Fed Funds, Interest Rate and Prime are entered prior to generating the report. These are the default values that the program uses in determining the objectives. These values can be customized by the client to allow for more accurate reporting. Results are revealed in a simple color-coded scheme allowing clients to see "at a glance" exposure to points of concern. (3e)
Exemplary source code follows:
To display the Basis points shaved using color codes: (3e)

```
Public Function ColorCodeBanks
Dim tmpAmt, tmpAmount As Double PointsShaved.
    Visible=True
'turn Overdraft balances to Red
Select Case AvgBal
Case Is>=0
    AvgBal.ForeColor=vbBlack
Case Else
    AvgBal.ForeColor=vbRed
End Select
'color code how many points are shaved
'constants representing colors are stored in an 'indude' file
Select Case PointsShaved
Case Is>=200
    'RED—>Worst offenders
    BankCode.ForeColor=vbRed
    BankName.ForeColor=vbRed
    PointsShaved.ForeColor=vbRed
Case 100 To 199
    BankCode.ForeColor=vbCyan
    BankName.ForeColor=vbCyan
    PointsShaved.ForeColor=vbCyan
Case 26 To 99
    BankCode.ForeColor=vbMagenta
    BankName.ForeColor=vbMagenta
    PointsShaved.ForeColor=vbMagenta
Case 1 To 25
    BankCode.ForeColor=vbDarkGreen
    BankName.ForeColor=vbDarkGreen
    PointsShaved.ForeColor=vbDarkGreen
Case Is<=0
    PointsShaved.Visible=False
    BankCode.ForeColor=vbBlue
    BankName.ForeColor=vbBlue
    PointsShaved.ForeColor=vbBlue
End Select
End Function
```

Objective algorithms:

The Fed Funds Income difference is determined by taking the inputted current Fed Funds percentage and multiplying it by the Available Balance, then subtracting the annualized Earnings Credit amount.

The T-Bill difference is determined by taking the inputted current Treasury Bill rate and multiplying by the Available Balance, then subtracting the annualized Earnings Credit Amount.

The Interest Yield difference is determined by taking the inputted current Interest rate and multiplying by the Available Balance, then subtracting the annualized Earnings Credit Amount.

Key Source Code functions and examples: (3c)
FedFundsIncomeDifference=[Forms]![EC Analysis Select]! [FedFunds]*[AvailableBal]−([EarningsCredit]*12)
TBillDifference=[Forms]![EC Analysis Select]![Tbill]* [AvailableBal]−([EarningsCredit]*12)
IncomeDifference=[Forms]! [EC Analysis Select]! [InterestRate]*[AvailableBal]−([EarningsCredit]* 12).

Source Code Display:
```
SELECT    IIf([AvgDlyPos]=0,([FedPct]/100)*[AdjBal],
    ([FedPct]/100)*[AvgDlyPos]) AS ReserveReq,
AnalysisHdr.CustomerNo, AnalysisHdr.BankCode, AnalysisHdr.RevDate, AnalysisHdr.AvgBal,
AnalysisHdr.AvgFloat, AnalysisHdr.FedPct, AnalysisHdr.ECRate, [AvgDlyNeg]+[AdjBal] AS AvgDlyPos,
AnalysisHdr.AvgDlyNeg, Banks.BankName, Customer.CustomerName, [AvgBal]−[AvgFloat] AS AdjBal,
Banks.City, Banks.State, [AvgDlyPos]−[ReserveReq] AS AvailableBalance, [AvailableBalance]*[ECRate]/1200
AS EaringsCredit, AnalysisHdr.NumberOfStores, [AvgFloat]/[NumberOfStores] AS AvgFloatPerStore,
AnalysisHdr.AnalysisNo,   IIf([AvgDlyPos]=0,[AdjBal]− [FedRes],[AvgDlyPos]−[FedRes]) AS AvailableBal,
IIf([AvgDlyPos]=0,([FedPct]/100)*[AdjBal],([FedPct]/ 100)*[AvgDlyPos)) AS FedRes,
AnalysisHdr.NegCollectedRate
FROM Customer INNER JOIN (Banks INNER JOIN AnalysisHdr ON Banks.BankCode=
AnalysisHdr.BankCode)   ON   Customer.CustomerNo= AnalysisHdr.CustomerNo;

Public Function CalcTBiliTotal(R As Report)
Dim tmpAmount As Double
If R!TBillIncomeDifference>0 Then
    tmpAmount=R!TBillIncomeDifference
    TBillDifference=TBillDifference+tmpAmount
End If
If R!FedFundsIncomeDifference>0 Then
    FedFundsDifference=R!FedFundsIncomeDifference+ FedFundsDifference
End If
If R!InterestYieldIncomeDifference>0 Then
    InterestYieldDifference=R!InterestYieldIncomeDifference+InterestYieldDifference
End If
CalcTBillTotal=tmpAmount
End Function
```

To derive sums and annualized results, the totals are added for each line (corresponding to one client Bank), and then multiplied by 12 for annualization. The report's objectives are supported by displaying the Average Investable income and the Annualized Projected income. (3d)

Report: Earnings Credit And Negative Collected Rates (FIG. 4)
Objective: Match the Earnings Credit on positive balances to the rate imposed on Negative Collected finds.

Figure 27:
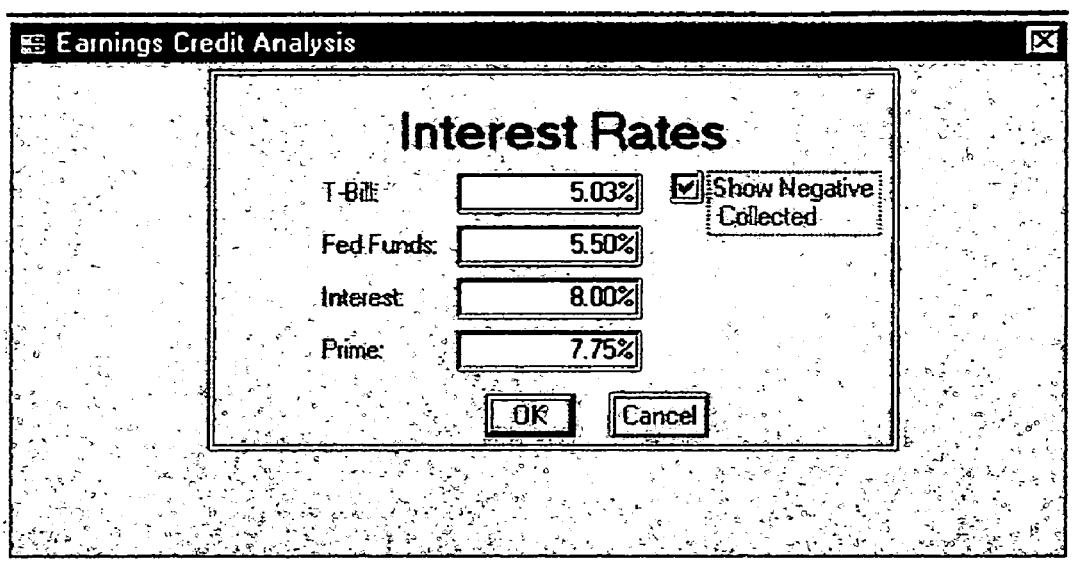

The report generation process begins with a data entry screen, as shown in FIG. 27.
Objective algorithm:
Display the Negative collected rate on the same report with the Earnings Credit rate.

Exemplary Source code:
Selects and displays the data shown on FIG. 4.
SELECT IIf([AvgDlyPos]=0,([FedPct]/100)*[AdjBal],([FedPct]/100)*[AvgDlyPos]) AS ReserveReq,
AnalysisHdr.CustomerNo, AnalysisHdr. BankCode, AnalysisHdr. RevDate, AnalysisHdr.AvgBal,
AnalysisHdr.AvgFltoat, AnalysisHdr.FedPct, AnalysisHdr.ECRate, [AvgDlyNeg]+[AdjBal] AS AvgDlyPos,
AnalysisHdr.AvgDlyNeg, Banks.BankName, Customer.CustomerName, [AvgBal]-[AvgFloat] AS AdjBal,
Banks.City, Banks.State, [AvgDlyPos]-[ReserveReq] AS AvailableBalance, [AvailableBalance]*[ECRate]/1200
AS EamingsCredit, AnalysisHdr.NumberOfStores, [AvgFloat]/[NumberOfStores] AS AvgFloatPerStore,
AnalysisHdr.AnalysisNo, IIf([AvgDlyPos]=0,[AdjBal]-[FedRes],[AvgDlyPos]-[FedRes]) AS AvailableBal,
IIf([AvgDlyPos]=0,([FedPct]/100)*[AdjBal),([FedPct]/100)*[AvgDlyPos]) AS FedRes,
AnalysisHdr.NegCollectedRate
FROM Customer INNER JOIN (Banks INNER JOIN AnalysisHdr ON Banks.BankCode=
AnalysisHdr.BankCode) ON Customer.CustomerNo=AnalysisHdr.CustomerNo;

Report: Checks Deposits and Float Data (FIG. 5)
Objectives:
1. Determine actual availability date of client's monies (5a)
2. Show abnormal Out Of District activity (5b)
3. Verify immediate availability of On Us activity (5c)
Exemplary Source Code for report output:
The INNER JOIN ensures proper bank and client information extracted.
SELECT IIf([AvgDlyPos]=0,([FedPct]/100)*[AdjBal],([FedPct]/100)*[AvgDlyPos]) AS ReserveReq,
AnalysisHdr.CustomerNo, AnalysisHdr.BankCode, AnalysisHdr.RevDate, AnalysisHdr.AvgBal,
AnalysisHdr.AvgFloat, AnalysisHdr. FedPct, AnalysisHdr.ECRate, [AvgDlyNeg]+[AdjBal] AS AvgDlyPos,
AnalysisHdr.AvgDlyNeg, Banks.BankName, Customer.CustomerName, [AvgBal]-[AvgFloat] AS AdjBal,
Banks.City, Banks.State, [AvgDlyPos]-[ReserveReq] AS AvailableBalance, [AvailableBalance]*[ECRate]/1200
AS EarningsCredit, AnalysisHdr.NumberOfStores, [AvgFloat]/[NumberOfStores] AS AvgFloatPerStore,
AnalysisHdr.AnalysisNo, IIf([AvgDlyPos]=0,[AdjBal]-[FedRes],[AvgDlyPos]-[FedRes]) AS AvailableBal,
IIf([AvgDlyPos]=0,([FedPct]/100)*[AdjBal],([FedPct]/100)*[AvgDlyPos]) AS FedRes,
AnalysisHdr.NegCollectedRate, Customer.PDL1, Customer.PDL2, Customer.PDL3, Customer.PDL4,
AnalysisHdr.ChecksOutDist, AnalysisHdr.ChecksInDist, AnalysisHdr.MixedDeposits,
AnalysisHdr.DepositTickets, AnalysisHdr.ChecksOnUs,
IIf([TotalChecksFloated]>0,[AvgFloat]/[TotalChecksFloated]*30,0) AS AvgCheckSize,
[ChecksOutDist]+[ChecksInDist]+[MixedDeposits] AS TotalChecksFloated, AnalysisHdr. DepCost,
AnalysisHdr.BAICost, AnalysisHdr.DepReconCost, AnalysisHdr. NightBagsCost
FROM Customer INNER JOIN (Banks INNER JOIN AnalysisHdr ON Banks.BankCode=
AnalysisHdr.BankCode) ON Customer.CustomerNo=AnalysisHdr.CustomerNo
ORDER BY AnalysisHdr.AvgFloat DESC;

Sample VBA Code: Checks Deposits and Float Data Code
1 VERSION 1.0 CLASS
2 BEGIN
3 MultiUse=-1 'True
4 END
5 Attribute VB_Name="Report_Checks Deposits and Float Data"
6 Attribute VB_GlobalNameSpace=False
7 Attribute VB_Creatable=True
8 Attribute VB_PredeclaredId=True
9 Attribute VB_Exposed=False
10 Option Compare Database
11 Option Explicit
12
13 Private Sub GroupF ter1_Print(Cancel As Integer, PrintCount As Integer)
14
15
16 End Sub
17
18 Private Sub Detail_Print(Cancel As Integer, PrintCount As Integer)
19 'this is done in the Activate Event now
20 'Dim tDT, tMD, tCOU, tCID, tCOD As Double
21 'Call CalcCDFData(Rep rt, tDT, tMD, tCOU, tCID, tCOD)
22 'DepositTickets=tDT
23 'MixedDep sits=tMD
24 'ChecksOnUs=tCOU
25 'ChecksInDist=tCID
26 'ChecksOutDist=tCOD
27 End Sub
28
29 Private Sub Report_Activate( )
30 'generate the activity data
31 Call CalcCDFData
32 End Sub
33
34 Private Sub Report_Deactivate( )
35 Application.Echo True
36 End Sub
37
38 Private Sub ReportFooter_Print(Cancel As Integer, PrintCount As Integer)
39 Dim tDT, tMD, tCOU, tCID, tCOD As Double
40 Call GetCheckDepTotals(Report, tDT, tMD, tCOU, tCID, tCOD)
41 SumDepositTickets=tDT
42 SumMixedDeposits=tMD
43 SumChecksOnUs=TCOU
44 SumChecksInDist=tCID
45 SumChecksOutDist=tCOD
46 End Sub Report: Breakdown By Service Charge Groups (FIG. 6)
Objectives:
1. Categorize Depository Costs (6a)
2. Categorize Check Costs (6b)
3. Categorize Account Maintenance Costs (6c)
Sample VBA Code: Breakdown By Service Charge Groups
For the report output:
SELECT IIf([AvgDlyPos]=0,([FedPct]/100)*[AdjBal],([FedPct]/100)*[AvgDlyPos]) AS ReserveReq,
AnalysisHdr.CustomerNo, AnalysisHdr.BankCode, AnalysisHdr.RevDate, AnalysisHdr.AvgBal, AnalysisHdr.AvgFloat, AnalysisHdr.FedPct, AnalysisHdr.ECRate, [AvgDlyNeg]+[AdjBal] AS AvgDlyPos, AnalysisHdr.AvgDlyNeg, Banks.BankName,
Customer.CustomerName, [Avg Bal]−[AvgFloat] AS AdjBal, Banks.City, Banks.State, [Avg DlyPos]−[Reserve-Req] AS
AvailableBalance, [AvailableBalance]*[ECRatel/1200 AS EaringsCredit, AnalysisHdr.NumberOfStores,
[AvgFloat]/[NumberOfStores] AS AvgFloatPerStore, AnalysisHdr.AnalysisNo, IIf([AvgDlyPos]=O,[AdjBal][FedRes],[AvgDlyPos]-[FedRes]) AS AvailableBal,
IIf([AvgDlyPos]=0,([FedPct/100)*[AdjBal],([FedPct]/100)*[AvgDlyPos]) AS FedRes, AnalysisHdr.NegCollectedRate,
Customer.PDL1, Customer.PDL2, Customer.PDL3, Customer.PDL4, AnalysisHdr.ChecksOutDist, AnalysisHdr.ChecksInDist,
AnalysisHdr.MixedDeposits, AnalysisHdr.DepositTickets, AnalysisHdr.ChecksOnUs,
IIf([TotalChecksFloated]>0,[AvgFloat]/[TotalChecksFloated]*30,0) AS AvgCheckSize,
[ChecksOutDist]+[ChecksInDist]+[MixedDeposits] AS TotalChecksFloated, AnalysisHdr.DepCost, AnalysisHdr.BAICost,
AnalysisHdr.DepReconCost, AnalysisHdr.NightBagsCost
FROM Customer INNER JOIN (Banks INNER JOIN AnalysisHdr ON Banks.BankCode=AnalysisHdr.BankCode) ON
Customer.CustomerNo=AnalysisHdr.CustomerNo
ORDER BY AnalysisHdr.AvgFloat DESC; For the calculations:

For the calculations:
Code

```
1 VERSION 1.0 CLASS
2 BEGIN
3 MultiUse =-1 'True
4 END
5 Attribute VB_Name="Rep rt_Breakdown By Service Charge Groups"
6 Attribute VB_GI balNameSpace=False
7 Attribute VB_Creatable=True
8 Attribute VB_PredeclaredId=True
9 Attribute VB_Exposed=False
10 Option Compare Database
11 Option Explicit
12
13 Private Sub Detail_Print(Cancel As Integer, PrintCount As Integer)
14 Dim crt As String
15 crt="[CustomerNo]='" & Forms!analysisHdr.CustomerNo & "'"
16 crt=crt & "AND [BankCode]='" & Report.BankCode & "'"
17 crt=crt & "AND [RevDate]=#" & FormsanalysisHdr.RevDate & "#"
18
19      AnnualServiceCharges=DSum("[ExtCharge]", "AnalysisDtlQ", crt)* 12
20 'Calculate the totals
21 DepositCost=CalcCostTotal(crt, 2)* 12
22 CheckDepCost=CalcCostTotal(crt, 1)* 12
23 BalInfoCost=CalcCostTotal(crt, 3)* 12
24 TotalCost=DepositCost+CheckDepCost+BalInfoCost
25 'derive %'s
26 DepositCostPer=DepositCost/AnnualServiceCharges
27 CheckDepCostPer=CheckDepCost/AnnualServiceCharges
28 BalInfoCostPer=BalInfoCost/AnnualServiceCharges
29 TotalCostPEr=TotalCost/AnnualServiceCharges
30
31 End Sub
32
33 Private Sub ReportFooter_Print(Cancel As Integer, PrintCount As Integer)
34 Dim crt As String
35 crt="[CustomerNo]='" & Forms!analysisHdr.CustomerNo & "'"
36 crt=crt & "AND [RevDate]=#" & Forms!analysisHdr.RevDate & "#"
37
38      SAnnualServiceCharges=DSum("[ExtCharge]", "AnalysisDtlQ", crt)* 12
39 'Calculate the totals
40 DepositCost=CalcCostTotal(crt, 2)* 12
41 SCheckDepCost=CalcCostTotal(crt, 1)* 12
42 SBalInfoCost=CalcCostTotal(crt, 3)* 12
43 STotalCost=SDepositCost+SCheckDepCost+SBalInfoCost
44 'derive %'s
45     SDepositCostPer=SDepositCost/SAnnualServiceCharges
46     sCheckDepCostPer=SCheckDepCost/SAnnualServiceCharges
47     SBalInfoCostPer=SBalInfoCost/SAnnualServiceCharges
48 STotalCostPer=STotalCost/SAnnualServiceCharges
49
50 End Sub
```

Figures 28, 29:
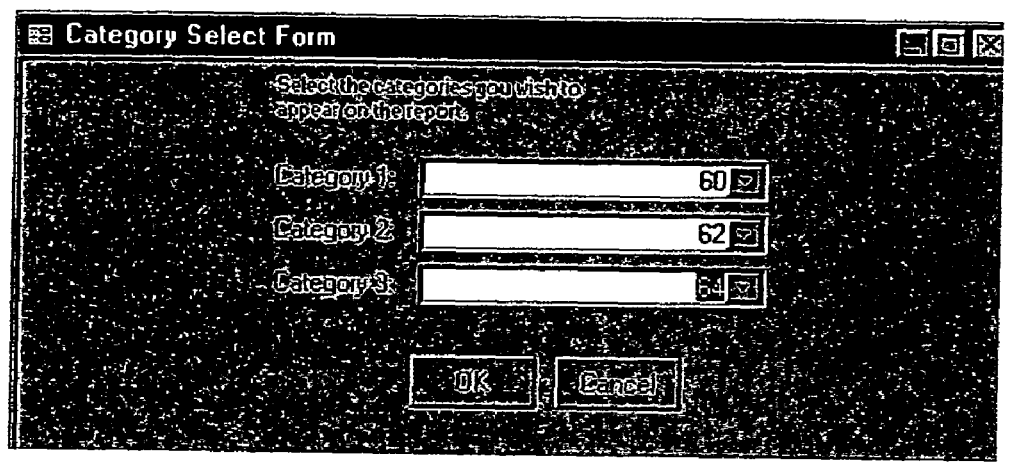
FIG. 28 shows the contents of a Category table which is used to generate the report in FIG. 7.
FIG. 29 is a screen display for selecting categories that the user wishes to appear in a report.

Report: Breakdown By User Supplied Groups (FIG. 7)
Objective: Categorize any user defined bank cost To achieve this special objective, an additional Category table, shown in FIG. 28, is added to the database. This table works in conjunction with the Service Codes table shown in FIG. 17. A Category Select Form is also used in this process. A screen display of the form is shown in FIG. 29. The example in FIG. 29 shows categories, 60 (night bags), 62 (rolled coins) and 64 (return checks) as being selected.

Sample VBA Code: Breakdown By Service Charges Variable
Code

```
1 VERSION 1.0 CLASS
2 BEGIN
3 MultiUse=-1 'True
4 END
5 Attribute VB_Name="Report_Breakdown By Service Charges Variable"
6 Attribute VB_GlobalNameSpace=False
7 Attribute VB_Creatable=True
8 Attribute VB_PredeclaredId=True
9 Attribute VB_Exposed=False
10 Option Compare Database
11 Option Explicit
12
13 Private Sub Detail_Print(Cancel As Integer, PrintCount As Integer)
14 Dim crt, CatCode1, CatCode2, CatCode3 As String
15 crt="[CustomerNo]='" & Forms!analysisHdr.CustomerNo & "'"
16 crt=crt & "AND [BankCode]='" & Report.BankCode & "'"
```

17 crt=crt & "AND [RevDate]=#" & Forms!analysisHdr.RevDate & "#"
18
19 CatCode1=Forms!CatSelet!CatCode1
20 CatCode2=Forms!CatSelet*!CatCode2
21 CatCode3=Forms!CatSelet*!CatCode3
22 AnnualServiceCharges=DSum("[ExtCharge]", "AnalysisDtlQ", crt)* 12
23 'Calculate the totals
24 'Var names are carried over from base report, they're actually Cat1, Cat2, Cat3
25 DepositCost=CalcCostTotal(crt, CatCode1)* 12
26 CheckDepCost=CalcCostTotal(crt, CatCode2)* 12
27 BalInfoCost=CalcCostTotal(crt, CatCode3)* 12
28 TotalCost=DepositCost+CheckDepCost+BalInfoCost
29 'derive %'s
30 DepositCostPer=DepositCost/AnnualServiceCharges
31 CheckDepCostPer=CheckDepCost/AnnualServiceCharges
32 BalInfoCostPer=BalInfoCost/AnnualServiceCharges
33 TotalCostPEr=TotalCost/AnnualServiceCharges
34
35 End Sub
36
37 Private Sub PageHeader_Print(Cancel As Integer, PrintCount As Integer)
38 Dim crt As String
39
40 crt="[CategoryCode]=" & Forms!CatSelect!CatCode1
41 CatLabel1=DLookup("[Description]", "Category", crt)
42
43 crt="[CategoryCode]=" & Forms!CatSelect!CatCode2
44 CatLabel2=DLookup("[Description]", "Category", crt)
45
46 crt="[CategoryCode]="& Forms!CatSelect!CatCode3
47 CatLabel3=DLookup("[Description]", "Category", crt)
48
49 End Sub
50
51 Private Sub Report_Activate( )
52 DoCmd.Maximize
53 End Sub
54
55 Private Sub ReportFooter_Print(Cancel As Integer, PrintCount As Integer)
56 Dim crt, CatCode1, CatCode2, CatCode3 As String
57 crt="[CustomerNo]='" & Forms!analysisHdr.CustomerNo & "'"
58 crt=crt & " AND [RevDate]=#" & Forms!analysisHdr.RevDate & "#"
59
60 CatCode1=Forms!CatSelet!3CatCode1
61 CatCode2=Forms!CatSelect!CatCode2
62 CatC de3=Forms!CatSelet!3CatCode3
63 SAnnualServiceCharges=DSum("[ExtCharge]", "AnalysisDtlQ", crt)* 12
64 'Calculate the totals
65 SDep sitcost=CalcCostT tal(crt, CatCode2)* 12
66 SCheckDepCost=CalcCostTotal(crt, CatCode1)* 12
67 SBalInf CoSt=CalcCostT tal(crt, CatCode3)* 12
68 ST talc st=SDep sitC st+SCheckDepC st+SBalInfoC st
69 'derive %'s
70 SDepositCostPer=SDepositCost/SAnnualServiceCharges
71 sCheckDepCostPer=SCheckDepCost/SAnnualServiceCharges
72 SBalInfoCostPer=SBalInfoCost/SAnnualServiceCharges
73 STotalCostPer=STotalCost/SAnnualServiceCharges
74 End Sub This report uses the same query as Breakdown by Service Charge groups for Report selection. However, in this report, the users can supply their own categories.

Figure 30:
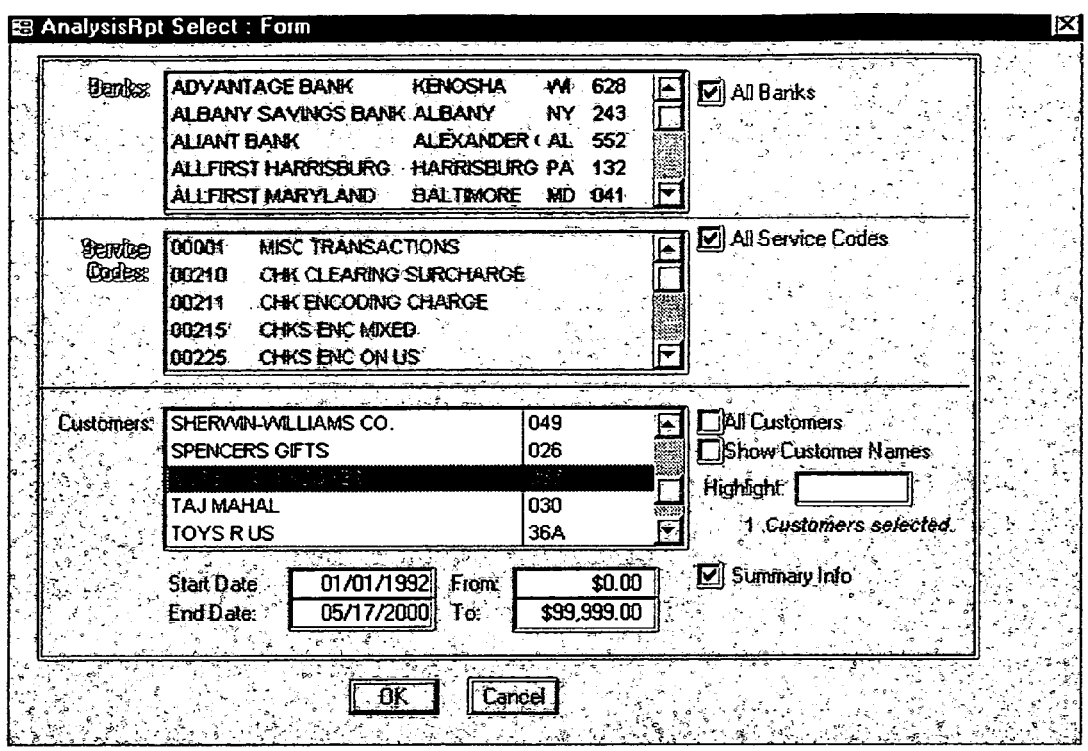
FIG. 30 is a screen display for selectively choosing any combination of clients, banks, and/or service charges that the user wishes to appear in a report.

Report: Unit Price Summary (FIG. 8)
Objective: Show every service charge assessed to a client
Sample code for the report output:
SELECT AnalysisHdr.CustomerNo, AnalysisHdr.BankCode, AnalysisHdr.RevDate, AnalysisDtl.ServiceCode, Banks.BankName, Banks.City, Banks.State, Customer.CustomerName, AnalysisDtl.Activity,
AnalysisDtl.UnitPrice, ServiceCodes.ServiceDescription, [UnitPrice]*[Activity]/[Per] AS ExtAmt,
ServiceCodes.Per, AnalysisDtl.ConCharge, AnalysisDtl.ConDate
FROM ServiceCodes INNER JOIN (((AnalysisDtl INNER JOIN Banks ON AnalysisDtl.BankCode=Banks.BankCode) INNER JOIN Customer ON AnalysisDtl.CustomerNo=Customer.CustomerNo) INNER JOIN AnalysisHdr ON (AnalysisHdr.RevDate=AnalysisDtl.RevDate) AND (AnalysisHdr.BankCode=AnalysisDtl.BankCode) AND (AnalysisDtl.CustomerNo=AnalysisDtl.CustomerNo) AND (Customer.CustomerNo=AnalysisHdr.CustomerNo) AND (Banks.BankCode=AnalysisHdr.BankCode)) ON ServiceCodes.ServiceCode=AnalysisDtl.ServiceCode
WHERE (((AnalysisDtl.ServiceCode)<"95000"));

This report features a customizable form to further allow varying degrees of results. A sample screen display of the form is shown in FIG. 30. The following source code controls the flexible data entry form shown in FIG. 30. It allows for the user to selectively choose any combination of clients, banks, and/or service charges. It also allows for entry of date ranges and dollar figures, and provides a method of highlighting particular information once the report is generated.

Code
1 VERSION 1.0 CLASS
2 BEGIN
3 MultiUse=-1 'True
4 END
5 Attribute VB_Name="Form_AnalysisRpt Select"
6 Attribute VB_GlobalNameSpace=False
7 Attribute VB_Creatable=True
8 Attribute VB_PredeclaredId=True
9 Attribute VB_Exp sed=False
Option Compare Database
11 Option Explicit
12
13 Private Sub BankCheck_Click( )
14' if the user wants every bank, don't let them select from the list box
15 Dim ctl As Control, itm As Variant
16 Set ctl=Me!BankList
17 If BankCheck Then
18 'turn ff anything they had selected
19 For Each itm In ctl.ItemsSelected

```
20 cti.Selected(itm)=False
21 Next itm
22 ' turn the Bank list box and counter OFF
23 BankList.Enabled=False
24 BanksSelected.Visible=False
25 'turn the OK button ON
26 Command16.Enabled=True
27 Else
28 ' turn the Bank List box and counter ON
29 BankList.Enabled=True
30 BanksSelected.Visible=True
31 End If
32
33 End Sub
34
35 Private Sub BankList_Click( )
36
37 'Controls the OK button, and makes sure we don't
   build too big of a query
38 'This procedure is also triggered when the Customer &
   service boxes are clicked
39 Dim totselected As Integer
40        totselected=BankList.ItemsSelected.Count+
   CustomerList.ItemsSelected.Count+ServiceList.
   ItemsSelected.Count
41
42 Select Case totselected
43 Case 0
44 If BankCheck Or ServiceCheck Or CustomerCheck
   Then
45 Command16.Enabled=True
46 Else
47 Command16.Enabled=False
48 End If
49
50 Case Is<=30 'Access limit is 40, I'm not taking any
   chances with memory
51 Command16.Enabled=True
52 Case Else
53 Command16.Enabled=False
54 MsgBox "The maximum number of custom selections
   is 30." & vbCr & "Please de-select some items and try
   again.", vbOKOnly, "Too many items selected"
55 End Select
56
57 End Sub
58
59 Private Sub Command16_Click( )
60 'October 99 Carmen DeLeo, Jr.
61 'crtAll will be the concatenation of all the built criteria
62 Dim Q As QueryDef, db As Database
63 Dim highlightCustNo, crtbank, crtService, crtcus-
   tomer, crtAll As String
64 Dim ctlBank, ctlService, ctlCustomer As Control
65 Dim itm As Variant
66
67 'get the bank(s) selected
68 '**********************
69 Set ctlBank=Me![BankList]
70 If Not BankCheck Then 'If they didn't select All
   banks, what did they select?
71 For Each itm In ctlBank.ItemsSelected
72 'Build the criteria string
73 If Len(crtBank)=0 Then
74 crtBank="[BankCode]='" & ctlBank.ItemData(itm) &
   "'"
75 Else
76 crtbank=crtBank & "OR [BankCode]='" & ctlBan-
   k.ItemData(itm) & "'"
77 End If
78 Next itm
79 If Len(crtBank)=0 Then
80 MsgB x "No Banks selected."
81 Exit Sub
82 EndIf
83 Else
84 'give us every bank
85 crtbank="[BankCode]>'0'"
86 End If
87
88 'get the Services
89 '****************
90 Set ctlService=Me![ServiceList]
91 If Not ServiceCheck Then 'If they didn't select All
   services, what did they select?
92 For Each itm In ctlService.ItemsSelected
93 ' Build it
94 If Len(crtService)=0 Then
95 crtService="[ServiceCode]='" & ctlService.ItemData
   (itm) & "'"
96 Else
97 crtService=crtService & "OR [ServiceCode]='" &
   ctlService.ItemData(itm) & "'"
98 End If
99 Next itm
100 If Len(crtService)=0 Then
101 MsgBox "No service codes selected."
102 Exit Sub
103 End If
104 Else
105 'Give us every service code
106 crtservice="[ServiceCode]>'0'"
107 End If
108
109 'get the customer accounts
110 '**********************
111 Set ctlcustomer=Me![CustomerList]
112 If Not CustomerCheck Then
113 For Each itm In ctlCustomer.ItemsSelected
114 If Len(crtCustomer)=0 Then
115 crtcustomer="[CustomerNo]='" & ctlCustomer.Item-
   Data(itm) & "'"
116 Else
117 crtCustomer=crtCustomer & "OR [CustomerNo]='"
   & ctlCustomer.ItemData(itm) & "'"
118 End If
119 Next itm
120 If Len(crtCustomer)=0 Then
121 MsgBox "No customers selected."
122 Exit Sub
123 End If 124 Else
125 'give us every customer
126 crtCustomer="[CustomerNo]>'0'"
127 End If
128
129 ' Put it all together for banks, services, clients
130 crtAll="(" & crtbank & ") AND (" & crtService & ")
   AND (" & crtCustomer &")"
131 'tack on date and dollar ranges
132 crtAll=crtAll & "AND [RevDate]>=#" & Me!Start-
   Date & "# AND [RevDate]<=#" & Me!EndDate & "#"
133 crtAll=crtAll & "AND [UnitPrice]>=" & Val(Me!
   StartDollar) & " AND [UnitPrice]<="& Val(Me!End
   Dollar)
```

```
134
135 'Run the rep rt with built criteria
136 If Sh wSummaryInfo Then
137 D Cmd.OpenRep rt "Analysis By Unit Price Summary", acViewPreview, , crtAll
138 Else
139 DoCmd.OpenRep rt "Analysis By Unit Price", acViewPreview,, crtAll
140 End If
141 End Sub
142
143 Private Sub Command17_Click( )
144 D Cmd.Cl se acF rm, "AnalysisRpt Select"
145 End Sub
146
147 Private Sub CustomerCheck_Click( )
148 'if the user wants every Customer, don't let them select from the list box
149 Dim cl As Control, itm As Variant
150 Set ctl=Me!CustomerList
151
152 If CustomerCheck Then
153 'turn off anything they had selected
154 For Each itm In ct.ItemsSelected
155 ctl.Selected(itm)=False
156 Next itm
157 'turn the Customer List box and counter OFF
158 CustomerList.Enabled=False
159 CustomersSelected.Visible=False
160 'turn the OK Button ON
161 Command16.Enabled=True
162 Else
163 'turn the Customer List box and counter ON
164 CustomerList.Enabled=True
165 CustomersSelected.Visible=True
166 End If
167 End Sub
168
169 Private Sub CustomerList_Click( )
170 BankList_Click
171 End Sub
172
173 Private Sub ServiceCheck_Click( )
174 Dim ctl As Control, itm As Variant
175
176 'if the user wants every Service, don't let them select from the list box
177 Set ctl=Me!ServiceList
178 If ServiceCheck Then
179 'turn off anything they had selected
180 For Each itm In ctl.ItemsSelected
181 ctl.Selected(itm)=False
182 Next itm
183 'turn off the whole List box and counter
184 ServiceList.Enabled=False
185 ServicesSelected.Visible=False
186
187 'put the OK button back ON
188 Command16.Enabled=True
189 Else
190 'turn the list box and counter back ON
191 ServiceList.Enabled=True
192 ServicesSelected.Visible=True
193 End If
194 End Sub
195
196 Private Sub ServiceList_Click( )
197 BankList_Click
198 End Sub
```

Once the criteria are set, the report is generated.

The following sample code generates the actual report of Unit Price Summary (FIG. 8) and also controls the highlighting of particular information as specified by the user above.

Code

```
1 VERSION 1.0 CLASS
2 BEGIN
3 MultiUse =-1 'True
4 END
5 Attribute VB_Name="Rep rt_Analysis By Unit Price"
6 Attribute VB_GlobalNameSpace=False
7 Attribute VB_Creatable=True
8 Attribute VB_PredeclaredId=True
9 Attribute VB_Exposed=False
10 Option Compare Database
11 Option Explicit
12
13 Private Sub Detail_Print(Cancel As Integer, PrintCount As Integer)
14 If Not IsNull(Forms![AnalysisRpt Select!highlightCustNo) Then
15 If CustomerNo=Nz(Forms![AnalysisRpt Select]!highlightCustNo) Then
16 CustomerNo.ForeColor=255
17 CustomerName.ForeColor=255
18 BankName.ForeColor=255
19 BankCode.ForeColor=255
20 City.ForeColor=255
21 State.ForeColor=255
22 Activity.ForeColor=255
23 UnitPrice.ForeColor=255
24 ExtAmt.ForeColor=255
25 RevDate.ForeColor=255
26 Else
27 CustomerNo.ForeColor=0
28 CustomerName.ForeColor=0
29 BankName.ForeColor=0
30 BankCode.ForeColor=0
31 City.ForeColor=0
32 State.ForeColor=0
33 Activity.ForeColor=0
34 UnitPrice.ForeColor=0
35 ExtAmt.ForeColor=0
36 RevDate.ForeColor=0
37 EndIf
38 End If
39 End Sub
40
41 Private Sub Report_Activate( )
42 DoCmd.Maximize
43 If Forms![AnalysisRpt Select]!ShowNames Then
44 CustomerName.Visible=True
45 Else
46 CustomerName.Visible=False
47 End If
48
49 End Sub
50
51 Private Sub ReportHeader_Print(Cancel As Integer, PrintCount As Integer)
52 Dim hcust As String
53   hCust=Nz(Forms![AnalysisRpt Selet]!highlightCustNo," ")
```

```
54 If Len(hCust)>0 Then
55   HighlightedCustomer=Forms![AnalysisRpt Select]
     !highlightCustNo
56   HighlightedCustomerName=DLookup("[Customer-
     Name]", "Customer", "[CustomerNo] ='" & hCust &
     "'")
57 Else
58 Label36.Visible=False
59 End If
60 End Sub
```
Report: Deposit Ticket Costs (FIG. 9)
Code
```
1 VERSION 1.0 CLASS
2 BEGIN
3 MultiUse =-1 'True
4 END
5 Attribute VB_Name="Report_Deposit Ticket Costs"
6 Attribute VB_GlobalNameSpace=False
7 Attribute VB_Creatable=True
8 Attribute VB_PredeclaredId=True
9 Attribute VB_Exposed=False
10 Option Compare Database
11 Option Explicit
12
13 Private Sub GroupFooter1_Print(Cancel As Integer,
   PrintCount As Integer)
14 '
15 '
16 End Sub
17
18 Private Sub Detail_Print(Cancel As Integer, Print-
   Count As Integer)
19 ' setup our temp variables
20 Dim tD, tDepC, tBAI, tBAIO, tBAIC, tDR, tDRC,
   tDRO, tDepR, tDepRC, tNB, tNBC As Double
21 'go get totals
22 Call CalcDepTicketData(Report, tBAI, tBAIO, tDR,
   tDRO, tDepR, tDepRC, tNB)
23 'assign fields on report
24 'Deposit=tD
25 'DepCost=tDepC *** Commented fields are calcu-
   lated in Activate proc
26 BAI=tBAI
27 'BAICost=tBAIC
28 BAIOTher=tAIO
29 DepRecon=tDR
30 'DepReconCost=tDRC
31 DepReconOther=tDRO
32 DepReorder=tDepR
33 DepReorderCost=tDepRC
34 NightBags=tNB
35 'NightBagsCost=tNBC
36 On Error Resume Next
37 If Loss1>0 Then Loss1.ForeColor=vbRed Else
   Loss1.ForeColor=vbBlack
38 If Loss2>0 Then Loss2.ForeColor=vbRed Else
   Loss2.ForeColor=vbBlack
39 If Loss3>0 Then Loss3.ForeColor=vbRed Else
   Loss3.ForeColor=vbBlack
40 If Loss4>0 Then Loss4.ForeColor=vbRed Else
   Loss4.ForeColor=vbBlack
41 On Error GoTo 0
42 End Sub
43
44 Private Sub Report_Activate( )
45 Call WriteDepTicketData
46 End Sub
47
48 Private Sub Report_Deactivate( )
49 Application.Echo True
50 End Sub
51
52 Private Sub ReportFooter_Print(Cancel As Integer,
   PrintCount As Integer)
53 Dim t1, t2, t3, t4, t5, t6, t7, t8, t9, t10, t11, t12 As
   Double
54 Call GetDepTicketTotals(Report, t1, t2, t3, t4, t5, t6,
   t7, t8, t9, t10, t11, t12)
55 SumDeposit=t1
56 SumDepCost=t2
57 SumBAI=t3
58 SumBAIC st=t4
59 SumBAIOther=t5
60 SumDepRecon=t6
61 SumDepReconCost=t7
62 SumDepReconOther=t8
63 SumDepReorder=t9
64 SumDepReorderCost=t10
65 SumNightBags=t11
66 SumNightBagsCost=t12
67
68
69 End Sub
70
71 Private Sub ReportHeader_Print(Cancel As Integer,
   PrintCount As Integer)
72 InitVars
73 End Sub
```

Multiplying the SumDeposit field in line 55 above by 12 provides the projected Annual cost incurred for one year's worth of deposit costs. (9a)

The BreakEvenDeposit (9a) is determined by the following formula:

$$(((([DepCost]+[BAICost]+[DepReconCost]+\\ [NightBagsCost])/[DepositTickets])*365)/\\ [\,Forms]!\,[DepCost\,Select]!/[ReturnRate]$$

where the ReturnRate is a value inputted by the user (9e) which represents a typical net profit percentage for the particular client.

The values referred to in (9c) are stored in the client's profile in the database.

Lines 37 through 40 of the code determine the appropriate color for values referenced in (9d).

Report: Cash Activity Costs (FIG. 10) Sample VBA Code for CashActivity Costs

```
Private Sub Detail_Print(Cancel As Integer, PrintCount As
   Integer)
Dim crt As String
crt="[CustomerNo]='" & Forms!analysisHdr.CustomerNo
   & "'"
crt=crt & "AND [BankCode]='" & Report.BankCode & "'"
crt=crt & "AND [RevDate]=#" & Forms!analysisHdr.Rev-
   Date & "#"
DepPerUnitCost=0 'reset it—so it doesn't dupe
'Cash Deposit Per 1000
CashDepPer1000=CalcDepTotal(crt, 101)
CashCostPer1000=CalcCostTotal(crt, 101)
If CashDepPer1000< >0 Then
   'avg unit cost has to multiply back by Per1000
   DepPerUnitCost=(CashCostPer1000/CashDepPer1000)*
      1000 FIG. 10, item 10b
```

```
End If
'Cash Strapped
DepStrappedUnitCost=0
CashDepStrapped=CalcDepTotal(crt, 102)
DepStrappedCost=CalcCostTotal(crt, 102)
If DepStrappedCost < >0 Then
   DepStrappedUnitCost=DepStrappedCost/CashDep-
      Strapped
End If
'Cash Loose
DepLooseUnitCost=0
CashDepLoose=CalcDepTotal(crt, 103)
DepLooseCost=CalcCostTotal(crt, 103)
If CashDepLoose < >0 Then
   DepLooseUnitCost=DepLooseCost/CashDepLoose
End If
'Other Cash costs
OtherCashUnitCos=0 'so it doesn't dupe
OtherCash=CalcDepTotal(crt, 104)
OtherCashTotal=CalcCostTotal(crt, 104)
If OtherCash < >0 Then
   OtherCashUnitCost=OtherCashTotal/OtherCash
End If
'Last few columns
'NightBagsCost=CalcCostTotal(crt, 60)
AvgCashPerStore=CashDepPer1000/NumberOfStores
CashOrderCost=CalcCostTotal(crt, 61)
RolledCoinCost=CalcCostTotal(crt, 62) (FIG. 10, item 10b)
BoxCoinCost=CalcCostTotal(crt, 63)
End Sub
```

Multiplying the results from (10b)* 12 yields the results in (10c).

Report: Banking Activity (FIG. 11)
Objective: Summarize information

This report summarizes information presented in other reports. It provides one place to view Deposit Ticket costs, BAI Detail costs, Dep Recon costs, Night Bag costs, and Rolled Coin Costs.

```
Code
1  VERSION 1.0 CLASS
2  BEGIN
3  MultiUse =-1 'True
4  END
5  Attribute VB_Name="Report_Banking Activity"
6  Attribute VB_GlobalNameSpace=False
7  Attribute VB_Creatable=True
8  Attribute VB_PredeclaredId=True
9  Attribute VB_Exposed=False
10 Option Compare Database
11 Option Explicit
12
13 Private Sub Detail_Print(Cancel As Integer, Print-
      Count As Integer)
14 Dim crt As String
15 crt="[CustomerNo]='" & Forms!analysisHdr.Cus-
      tomerNo & "'"
16 crt=crt & "AND [BankCode]='" & Report.BankCode
      & "'"
17 crt=crt & "AND [RevDate]=#" & Forms!analysisH-
      dr.RevDate & "#"
18
19 Dep sitTickets=CalcDepT tal(crt, 20)
20 BAIDetail=CalcDepT tal(crt, 40)
21 D pRecon=CalcDepTotal(crt, 45)
22 DepErrors=CalcDepT tal(crt, 46)
23 ChecksDep sited=CalcDepT tal(crt, 1)
24 CashDep sited=CalcDepTotal(crt, 101)
25 NightBags=CalcDepT tal(crt, 60)
26 CashOrdered=CalcDepTotal(crt, 61)
27 RolledCoin=CalcDepTotal(crt, 62)
28 BoxCoin=CalcDepTotal(crt, 63)
29 ReturnChecks=CalcDepTotal(crt, 64)
30 ReturnChecksReDep=CalcDepTotal(crt, 65)
31 ReturnCheckBuyBack=CalcDepTotal(crt, 66)
32 NSFUNCOD=CalcDepTotal(crt, 67)
33
34
35 End Sub
36
37 Private Sub Report_Activate( )
38 DoCmd.Maximize
39 End Sub
40
41 Private Sub ReportFooter_Print(Cancel As Integer,
      PrintCount As Integer)
42 'Carmen J. DeLeo Jul. 8, 1999
43 Dim crt As String
44 'No bank criteria on Sums
45 crt="[CustomerNo]='" & Forms!analysisHdr.Cus-
      tomerNo & "'"
46 crt=crt & "AND [RevDate]=#" & Forms!analysisHdr.
      RevDate & "#"
47 SDepositTickets=CalcDepTotal(crt, 20)
48 SBAIDetail=CalcDepTotal(crt, 40)
49 SDepRecon=CalcDepTotal(crt, 45)
50 SDepErrors=CalcDepTotal(crt, 46)
51 SChecksDeposited=CalcDepTotal(crt, 1)
52 SCashDeposited=CalcDepTotal(crt, 101)
53 SNightBags=CalcDepTotal(crt, 60)
54 SCashOrdered=CalcDepTotal(crt, 61)
55 SRolledCoin=CalcDepTotal(crt, 62)
56 SBoxCoin=CalcDepTotal(crt, 63)
57 SReturnChecks=CalcDepTotal(crt, 64)
58 SReturnChecksRedep=CalcDepTotal(crt, 65)
59 SReturnCheckBuyback=CalcDepTotal(crt, 66)
60 SNSFUNCOD=CalcDepTotal(crt, 67)
61
62 End Sub
```

CalcDepTotal function is used in many of the reports:
```
Public Function CalcDepTotal(crt As String, CatCode)
Dim tmpAmount, tmpCost As Double
Dim msg, crtAll As String
crtAll=crt & "AND [CategoryCode]=" & CatCode
tmpAmount=Nz(DSum("[Activity]", "AnalysisDtlSubTo-
   talsQ", crtAll), 0)
CalcDepTotal=tmpAmount
End Function
```

This function is vital to determining the totals stored in the underlying Analysis Detail tables. As illustrated by the source code, this routine processes a category, then returns the total based on the Service and Category tables.

Report: Analysis By Unit Price (FIG. 12)

The source code is equivalent to the above report, except for the output.

Note: The Detail section of this report is not hidden, thereby showing the supporting data.
SELECT AnalysisHdr.CustomerNo, AnalysisHdr.Bank-Code, AnalysisHdr.RevDate, AnalysisDtl.ServiceCode, Banks.BankName, Banks.City, Banks.State, Customer.CustomerName, AnalysisDtl.Activity, AnalysisDtl.UnitPrice, ServiceCodes.ServiceDescription, [UnitPrice]*[Activity]/[Per] AS ExtAmt,
ServiceCodes.Per, AnalysisDtl.ConCharge, AnalysisDtl.ConDate
FROM ServiceCodes INNER JOIN (((AnalysisDtl INNER JOIN Banks ON AnalysisDtl.BankCode=
Banks.BankCode) INNER JOIN Customer ON AnalysisDtl.CustomerNo=Customer.CustomerNo) INNER JOIN AnalysisHdr ON (AnalysisHdr.RevDate=AnalysisDtl.RevDate) AND (AnalysisHdr.BankCode=
AnalysisDtl.BankCode) AND (AnalysisHdr.CustomerNo=AnalysisDtl.CustomerNo) AND
(Customer.CustomerNo=AnalysisHdr.CustomerNo) AND (Banks.BankCode=AnalysisHdr.BankCode)) ON
ServiceCodes.ServiceCode=AnalysisDtl.ServiceCode
WHERE (((AnalysisDtl.ServiceCode)<"95000"));

Determining Particular Category Costs

FIG. 31 and FIG. 32 show excerpts from charts that disclose the method for determining a particular category's cost, using Night Bags as an example. This functionality is used frequently throughout the software.

The following code will determine the total cost. It assumes that the statement data has been keyed in, during the Dynamic Compilation phase.
Public Function CalcCostTotal(crt, CatCode)
'return the cost of a group of service charges
Dim tmpAmount, tmpcost As Double
Dim msg, crtAll As String
crtAll=crt & "AND [CategoryCode]=" & Catode
tmpAmount=Nz(DSum("[ExtCharge]", "AnalysisDtlSubTotalsQ", crtAll), 0)
CalcCostTotal=tmpAmount
End Function This algorithm applies directly to Breakdown By Service Charge, and by User Supplied Groups.

SECTION IV—ILLUMINATION (FIG. 13 and FIG. 14)

FIG. 33 is a screen display of a Working Sheet Form that is used to summarize ServiceDescription items, and their actual costs and potential cost savings.

The Bank Analyzer described above allows a client to obtain information that they have never been able to access. In doing so, it permits the client to eliminate wasteful banking transactions, reduce the amount of transactions and obtain a reduction in bank service charges and other charges and fees.

The Bank Analyzer is preferably used by a third party entity, who has a plurality of clients who provide the third party entity with their respective bank information for analysis. The third party entity may then build up a historical database of bank charges and credits from a plurality of different banks, and can then provide accurate comparisons of a specific client's bank analysis. However, the Bank Analyzer may also be sold or licensed by the third party entity to a client, along with a database of current bank data so that the client may perform their own analyses.

The present invention may be implemented with any combination of hardware and software. The present invention can be included in an article of manufacture (e.g., one or more computer program products) having, for instance, computer useable media. The media has embodied therein, for instance, computer readable program code means for providing and facilitating the mechanisms of the present invention. The article of manufacture can be included as part of a computer system or sold separately.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention.

What is claimed is:

1. A computer-implemented method of preparing bank service charge reports for banking activity of a client, the method comprising:
   (a) providing an electronic translator for converting service charge items of a plurality of individual banks, expressed in terminology of the respective individual banks, to a service description expressed in a standardized terminology, wherein at least some of the service charge items of different banks have the same standardized service description;
   (b) inputting bank service charge items and bank account data into a computer, the bank service charge items and bank account data being for a specified period of time for one or more banks being used by a client, the bank service charge items and bank account data being obtained from one or more bank statements of a client and being expressed in the one or more statements in terminology used by the one or more banks; and
   (c) in the computer, automatically creating one or more bank service charge reports for the client from the inputted bank service charge items by using the electronic translator, each bank service charge report providing a breakdown of bank service charges based upon the standardized service descriptions.

2. The method of claim 1 wherein a subset of the standardized service descriptions of bank service charges define a total amount of a predefined type of bank service charge costs, the method further comprising:
   (d) calculating the total amount of a predefined type of bank service charge costs by adding together the bank service charges in the subset, and creating a total cost report for the predefined type of bank service charge costs from the calculated total.

3. The method of claim 2 wherein the subset defines total depository costs.

4. The method of claim 2 wherein the subset defines total check costs.

5. The method of claim 2 wherein the subset defines total account maintenance costs.

6. The method of claim 1 wherein the specified period of time is one month.

7. The method of claim 1 wherein the standardized service descriptions are understandable by a layperson.

8. The method of claim 1 wherein at least some of the bank terminology for service charges are unique to one of the individual banks.

9. The method of claim 1 further comprising:
   (d) providing a historical database of average bank service charges for selected standardized service descriptions based upon bank service charges of a plurality of clients; and
   (e) in the computer, comparing the individually broken down bank service charges created in step (c) to the average bank service charges, wherein the comparison may be used by the client to identify potentially excessive bank service charges.

10. The method of claim 1 further comprising:
(d) providing a database of bank service charges for each of the standardized service descriptions based upon bank service charges of all of the banks used by the client; and
(e) in the computer, comparing the individually broken down bank service charges created in step (c) for one of the client's banks to the bank service charges for other banks used by the client, wherein the comparison may be used by the client to identify potentially excessive bank service charges.

11. The method of claim 1 wherein one of the standardized service charge items is deposit ticket costs, and deposits have a predefined earnings credit rate, the method further comprising:
(d) in the computer, using the deposit ticket costs and the earnings credit rate to calculate a breakeven deposit amount wherein the earnings credit exceeds the cost of depositing money, and creating a report thereof.

12. An article of manufacture for preparing bank service charge reports for banking activity of a client, the article of manufacture comprising a computer-readable medium holding computer-executable instructions for performing a method comprising:
(a) providing an electronic translator for converting service charge items of a plurality of individual banks, expressed in terminology of the respective individual banks, to a service description expressed in a standardized terminology, wherein at least some of the service charge items of different banks have the same standardized service description;
(b) inputting bank service charge items and bank account data into a computer, the bank service charge items and bank account data being for a specified period of time for one or more banks being used by a client, the bank service charge items and bank account data being obtained from one or more bank statements of a client and being expressed in the one or more statements in terminology used by the one or more banks; and
(c) in the computer, automatically creating one or more bank service charge reports for the client from the inputted bank service charge items by using the electronic translator, each bank service charge report providing a breakdown of bank service charges based upon the standardized service descriptions.

13. The article of manufacture of claim 12 wherein a subset of the standardized service descriptions of bank service charges define a total amount of a predefined type of bank service charge costs, the computer-executable instructions performing a method further comprising:
(d) calculating the total amount of a predefined type of bank service charge costs by adding together the bank service charges in the subset, and creating a total cost report for the predefined type of bank service charge costs from the calculated total.

14. The article of manufacture of claim 13 wherein the subset defines total depository costs.

15. The article of manufacture of claim 13 wherein the subset defines total check costs.

16. The article of manufacture of claim 13 wherein the subset defines total account maintenance costs.

17. The article of manufacture of claim 12 wherein the specified period of time is one month.

18. The article of manufacture of claim 12 wherein the standardized service descriptions are understandable by a layperson.

19. The article of manufacture of claim 12 wherein at least some of the bank terminology for service charges are unique to one of the individual banks.

20. The article of manufacture of claim 12 wherein the computer-executable instructions perform a method further comprising:
(d) providing a historical database of average bank service charges for selected standardized service descriptions based upon bank service charges of a plurality of clients; and
(e) in the computer, comparing the individually broken down bank service charges created in step (c) to the average bank service charges, wherein the comparison may be used by the client to identify potentially excessive bank service charges.

21. The article of manufacture of claim 12 wherein the computer-executable instructions perform a method further comprising:
(d) providing a database of bank service charges for each of the standardized service descriptions based upon bank service charges of all of the banks used by the client; and
(e) in the computer, comparing the individually broken down bank service charges created in step (c) for one of the client's banks to the bank service charges for other banks used by the client, wherein the comparison may be used by the client to identify potentially excessive bank service charges.

22. The article of manufacture of claim 12 wherein one of the standardized service charge items is deposit ticket costs, and deposits have a predefined earnings credit rate, the computer-executable instructions performing a method further comprising:
(d) in the computer, using the deposit ticket costs and the earnings credit rate to calculate a breakeven deposit amount wherein the earnings credit exceeds the cost of depositing money, and creating a report thereof.

* * * * *